United States Patent

Shen et al.

[11] Patent Number: 5,956,088
[45] Date of Patent: *Sep. 21, 1999

[54] METHOD AND APPARATUS FOR MODIFYING ENCODED DIGITAL VIDEO FOR IMPROVED CHANNEL UTILIZATION

[75] Inventors: Paul Shen; Efraim Arazi, both of San Francisco; Edward A. Krause, El Cerrito; Adam S. Tom, San Francisco, all of Calif.

[73] Assignee: Imedia Corporation, San Francisco, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/561,296

[22] Filed: Nov. 21, 1995

[51] Int. Cl.$^6$ ........................................... H04N 7/12
[52] U.S. Cl. .......................... 348/385; 370/477; 348/387
[58] Field of Search .................... 348/385, 387, 348/409, 413, 415, 416, 845.2, 705, 390; 370/365, 368, 470, 232, 477, 517, 536–543

[56] References Cited

U.S. PATENT DOCUMENTS

| | | | |
|---|---|---|---|
| 4,455,649 | 6/1984 | Esteban et al. | 370/80 |
| 4,477,900 | 10/1984 | Gruenberg | 370/112 |
| 4,494,232 | 1/1985 | Dambrackas et al. | 370/80 |
| 4,639,909 | 1/1987 | Nirschl et al. | 370/368 |
| 4,949,187 | 8/1990 | Cohen | 358/335 |

(List continued on next page.)

FOREIGN PATENT DOCUMENTS

| | | | |
|---|---|---|---|
| 0 382 892 | 8/1990 | European Pat. Off. | H04N 7/13 |
| 0 515 101 A2 | 11/1992 | European Pat. Off. | H04N 7/13 |
| 0 562 221 A1 | 9/1993 | European Pat. Off. | H04N 5/907 |
| 0 625 857 A1 | 11/1994 | European Pat. Off. | H04N 7/173 |
| 0 627 858 A2 | 12/1994 | European Pat. Off. | H04N 7/13 |

(List continued on next page.)

OTHER PUBLICATIONS

O'Shea, "Bell Atlantic Rides ADSL Into Video Future", *Telephony*, Nov. 1, 1993, pp. 60–62.

U.S. Patent Application No. 08/560,219, filed Nov. 21, 1995, Shen et al.

U.S. Patent Application No. 08/561,410, filed Nov. 21, 1995, Krause et al.

Haskell, B.G., and Reiman, A.R. (1994) "Multiplexing of variable rate encoded streams." IEEE Transcations on circuits and Systems for Video Technology, (4)4, 417–424.

U. Riemann, "Der MPEG–2–Standard Generische Codierung für Bewegtbilder und zugehöriger Audio–Information—Multiplex–Spezifikation für die flexible Übertragung digitaler Datenströme (Teil 5_2)," Fernseh–und Kino–Technik, vol. 48, No. 10, pp. 545–553 (Oct. 1994), XP000468290.

Perkins, M and D. Arnstein, "Statistical Multiplexing of Multiple MPEG–2 Video Programs in a Single Channel," SMPTE Journal, 104 (1995) Sep., No. 9, pp. 596–599, XP000523229.

(List continued on next page.)

*Primary Examiner*—Victor R. Kostak
*Attorney, Agent, or Firm*—McCutchen, Doyle, Brown & Enersen, LLP

[57] ABSTRACT

A method for increasing channel utilization for a data channel transmitting a multiplex of a set of one or more encoded program streams, each program stream in being decodeable by a corresponding decoder, each corresponding decoder including a corresponding decoder buffer, the decoder buffers having a maximum allowable size, the method comprising selecting encoded pictures to be modified, said selecting according to a criterion which includes preventing any underflow of any decoder buffer, modifying each said selected encoded picture to form a corresponding modified encoded picture, said modified encoded picture having less data than said selected encoded picture, and transmitting the corresponding modified encoded pictures through the channel in place of the selected encoded pictures.

34 Claims, 7 Drawing Sheets

U.S. PATENT DOCUMENTS

| | | | |
|---|---|---|---|
| 4,975,771 | 12/1990 | Kassatly | 348/385 |
| 5,115,309 | 5/1992 | Hang | 358/133 |
| 5,144,425 | 9/1992 | Kuriacose | 358/133 |
| 5,146,564 | 9/1992 | Evans et al. | 395/250 |
| 5,216,503 | 6/1993 | Paik et al. | 358/133 |
| 5,241,383 | 8/1993 | Chen et al. | 358/136 |
| 5,289,470 | 2/1994 | Chang et al. | 370/94.1 |
| 5,291,281 | 3/1994 | Paik et al. | 348/384 |
| 5,305,113 | 4/1994 | Iwamura et al. | 358/312 |
| 5,319,457 | 6/1994 | Nakahashi et al. | 348/387 |
| 5,355,372 | 10/1994 | Sengupta et al. | 370/368 |
| 5,361,096 | 11/1994 | Ohki et al. | 348/387 |
| 5,414,455 | 5/1995 | Hooper et al. | 348/7 |
| 5,457,688 | 10/1995 | Anderson | 370/85.8 |
| 5,506,844 | 4/1996 | Rao et al. | 370/84 |
| 5,519,780 | 5/1996 | Woo et al. | 380/49 |
| 5,541,919 | 7/1996 | Yong et al. | 370/61 |
| 5,546,118 | 8/1996 | Ido | 348/7 |
| 5,550,590 | 8/1996 | Sakazawa et al. | 348/387 |
| 5,550,889 | 8/1996 | Shiojiri et al. | 348/387 |
| 5,566,174 | 10/1996 | Sato et al. | 348/423 |
| 5,568,274 | 10/1996 | Fujinami et al. | 386/107 |
| 5,568,476 | 10/1996 | Sherer et al. | 370/60 |
| 5,594,491 | 1/1997 | Hodge et al. | 378/7 |
| 5,603,058 | 2/1997 | Belknap et al. | 395/855 |
| 5,612,742 | 3/1997 | Krause et al. | 348/385 |
| 5,621,463 | 4/1997 | Lyons et al. | 348/387 |
| 5,650,825 | 7/1997 | Naimpally et al. | 348/465 |
| 5,687,095 | 11/1997 | Haskell et al. | 348/387 |
| 5,691,986 | 11/1997 | Pearlstein | 348/387 |
| 5,729,293 | 3/1998 | Keesman | 348/401 |

FOREIGN PATENT DOCUMENTS

| | | | |
|---|---|---|---|
| 0 653 885 A1 | 5/1995 | European Pat. Off. | H04N 7/173 |
| 0 661 885 A1 | 7/1995 | European Pat. Off. | H04N 7/26 |
| 0 690 392 A1 | 1/1996 | European Pat. Off. | G06F 17/14 |
| 0 690 626 A2 | 1/1996 | European Pat. Off. | H04N 7/173 |
| 0 705 042 A2 | 4/1996 | European Pat. Off. | H04N 7/58 |
| 0 711 077 A2 | 5/1996 | European Pat. Off. | H04N 7/24 |
| 63 092140 | 4/1988 | Japan | H04L 11/20 |
| 63 222592 | 9/1988 | Japan | H04N 7/13 |
| 5-64175 | 2/1993 | Japan | H04N 7/13 |
| 05 095340 | 4/1993 | Japan | H04J 3/22 |
| 2 289 194 | 11/1995 | United Kingdom | H04J 3/16 |
| WO 95/29559 | 2/1995 | WIPO | H04N 7/12 |
| WO 95/26103 | 9/1995 | WIPO | H04N 5/76 |

OTHER PUBLICATIONS

Puri, A. et al., "Temporal Resolution Scalable Video Coding," IEEE (1994), Publication Date: Nov. 13, 1994, pp. (947–951), XP000522755.

Sun, Huifang and Wilson Kwok, "MPEG Video Coding with Temporal Scalability," Publication Date: Jun. 18, 1995, pp. (1742–1746), XP000535047.

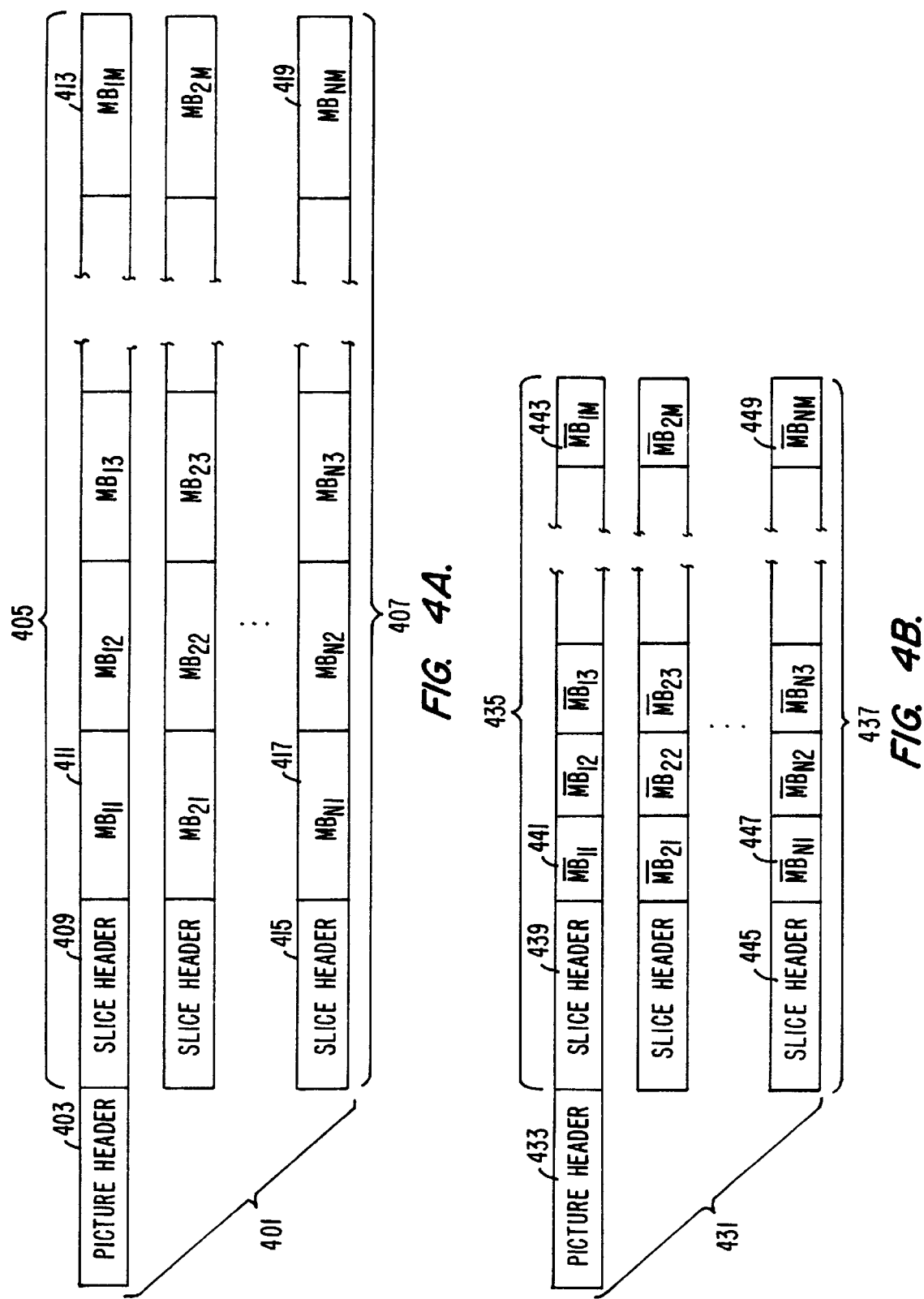

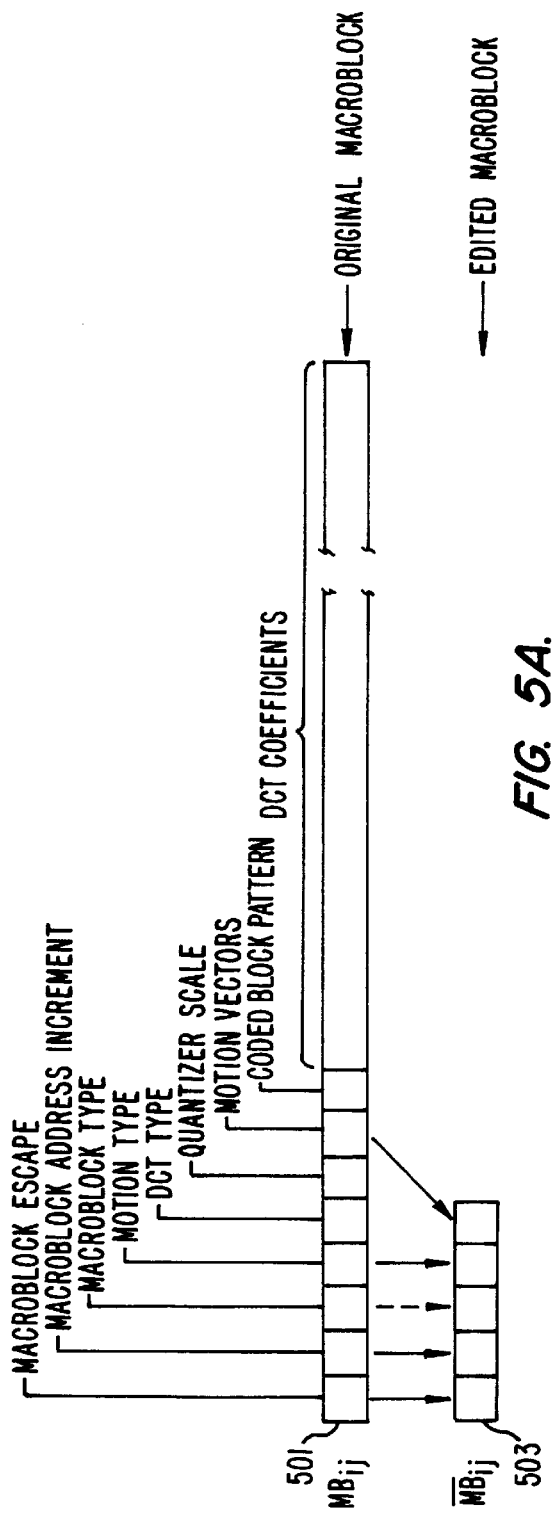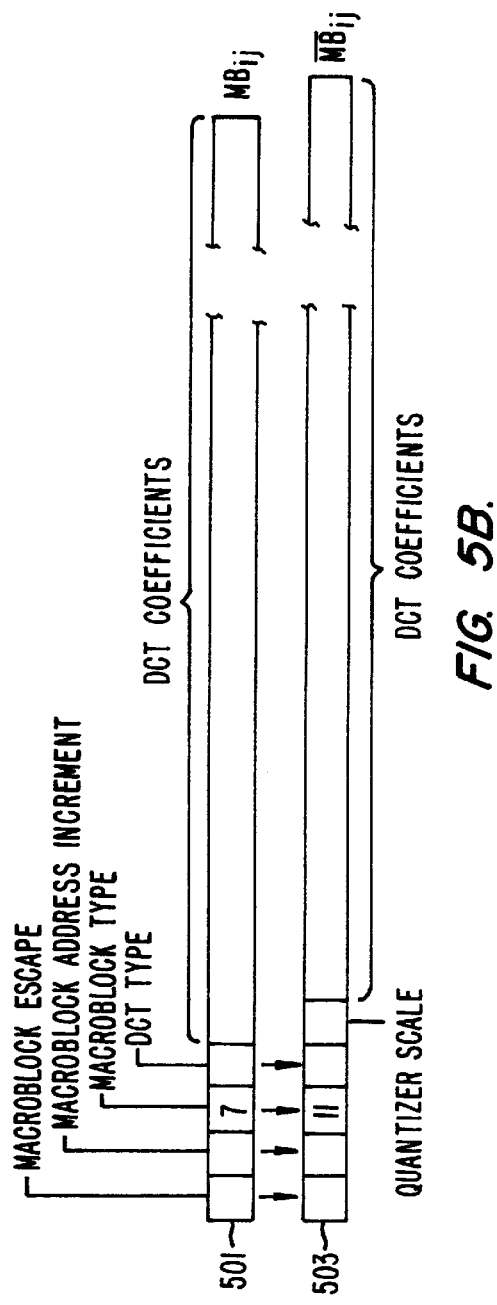

METHOD AND APPARATUS FOR MODIFYING ENCODED DIGITAL VIDEO FOR IMPROVED CHANNEL UTILIZATION

I. BACKGROUND OF THE INVENTION

A. Field of the Invention

The field of the present invention is video compression.

B. Background

The present invention relates to the encoding, formatting, and distribution of compressed video programs. It is particularly, but not necessarily, applicable to a particular video compression technique known as variable bit-rate (VBR) encoding. VBR encoding can be used to overcome the well-known problem of most video compression encoders where the perceived image quality tends to vary as a function of image complexity. Typically, a video program will contain a variety of scenes. Many of these scenes are lacking in motion or detail and are therefore easily compressed, while many other scenes contain complex details which are generally more difficult to compress, particularly when moving in a complex or random manner. Therefore, unless the available bandwidth is very high, the perceived quality of the decompressed and reconstructed images will tend to vary from one scene to the next. This problem becomes more serious as the available bandwidth is reduced until, eventually, the video quality becomes unacceptable, often because of just a few problem scenes.

VBR encoding overcomes this problem by allocating more bits to those scenes which are difficult to compress and fewer bits to those scenes which are more easily compressed. In this way, the decompressed and reconstructed images can be made to appear consistently uniform, and therefore superior to the reconstructed images derived from the constant bit-rate encoder adjusted for the same average rate of compression. As a result, it is possible to compress a video program more efficiently when using the VBR encoding technique. This not only increases the number and variety of programs or program streams that can be delivered over a fixed-bandwidth communication channel, but also reduces the storage capacity requirements at the head end or other site where the program library is maintained.

The disadvantage of the VBR encoding technique is that it presents certain problems when manipulating or editing the compressed bit-streams. In particular, it becomes difficult to efficiently utilize a fixed-bandwidth communication channel since the variable bit-rate stream may at times exceed the capacity of the channel, while at other times, it may utilize only a fraction of the available channel capacity. As would be clear to one in the art, the possibility of exceeding the capacity of the channel is not only a problem with VBR encoded data. The present invention is applicable also to non-VBR encoded data.

One known technique that is used to alleviate this problem is to buffer the compressed bit-stream at the transmission end of the communication channel in order to convert the variable rate stream to a constant rate stream. In such a case, it is also necessary to buffer the signal received at the other end of the channel in order to recover the variable rate stream that is necessary for proper timing of the reconstructed video images. Unfortunately, the required amount of buffering would be prohibitively expensive and would introduce long delays into the distribution system. Moreover, existing video compression standards such as the MPEG standards, a set of International Organization for Standardization/International Electrotechnical Commission (ISO/IEC) standards, specify limits on the amount of buffering required for conforming decoders. Therefore, it is important that the received bitstreams be decodable without exceeding these limits. That is, it is important to find methods for reducing the decoder memory requirements.

Another prior art technique that can be used to reduce the inefficiency of transmitting VBR encoded (and non-VBR encoded) programs over a fixed-bandwidth channel combines a plurality of program streams into a single multiplex. Although each additional program stream will increase the overall data rate of the multiplex, the variance of the average per stream data rate of this multiplex will tend to decrease in approximate proportion to the number of program streams, assuming approximate statistical independence of them. Therefore, if the nominal rate that can be accommodated by the channel is significantly greater than the average rate of a single program stream, then the channel utilization can be significantly improved. This technique is known in the art as statistical multiplexing.

When using buffering, one prior art method of assuring that buffer overflow does not occur is to add feedback between the encoder buffer and the encoder. When the buffer approaches a full state, a buffer fullness signal from the buffer informs the encoder to reduce the bit-rate so that the buffer does not overflow. When the buffer has more room; the feedback signal, from the buffer to the encoder, enables the encoder to increase the bit-rate in order to maintain image quality. Such feedback is particularly effective when combined with statistical multiplexing. A single encoder buffer may be used, or several buffers. In the case of a single buffer, it would be at the output of the multiplexer, and feedback from that buffer would be to all the encoders of the programs being multiplexed. Because the multiplexing reduces effective per stream data rate variance, in general, less memory would be required to convert the multiplex to a fixed bit-rate stream than if each individual encoder included a VBR-to-constant bit-rate buffer.

Statistical multiplexing with feedback for conveying encoded, particularly VBR encoded program streams over fixed-bandwidth channels, can be effective, but generally may not be sufficient when uniform perceived image quality is important.

In addition, there are often situations where no feedback is possible between the output buffer of the multiplexer and the individual encoders. One such situation occurs when multiplexing already encoded data streams. Another occurs when the encoders are located in an area physically remote from the multiplexer. Both these situations are referred to herein as remote encoding, indicating that encoding and multiplexing are remote in time, location, or otherwise, so that no feedback is possible from the multiplexer to the encoders of the program streams to be multiplexed.

In addition, one of the factors that limits the efficiency of transmitting the multiplexed bit stream is the finite overall memory available for buffering at the decoder/demultiplexer. While statistical multiplexing usually provides sufficient benefit due to the small probability that all program streams will have complex scenes at the same time, there is still a finite chance of such data rate peaks occurring. To accommodate these peaks, long delays, and therefore large buffers, must be designed into the decoders in order to prevent the decoder buffers from underflowing when the capacity of the channel is insufficient to deliver the data in time for decoding. The opposite extreme occurs when all of the programs contain scenes which are easily compressed. In this case, data can be delivered too quickly and the decoder buffers may overflow unless fill packets, containing stuffing bytes, are inserted into the bit stream. This reduces channel utilization (channel efficiency) since the fill packets are not useful for decoding and are discarded at the receivers.

Our co-pending U.S. patent application entitled "Method and Apparatus for Multiplexing Video Programs For Improved Channel Utilization," filed concurrently with the present application, incorporated herein by reference, and hereinafter referred to as "Our Multiplexing Invention," discloses a multiplexing method for determining the order of forming the multiplex that assures that no overflow occurs in any decoder buffer, thereby increasing the efficiency of transmitting the multiplex. Even when using the method of Our Multiplexing Invention, there is still a finite chance that all program streams have scenes at the same time of such complexity and that peaks in the decoder buffer memory requirement are such that no more decoder buffer space is available. A method for reducing such data rate fluctuations is disclosed in our co-pending U.S. patent application entitled "Method and Apparatus for Increasing Channel Utilization for Digital Video Transmission," filed concurrently with the present application, incorporated herein by reference, and hereinafter referred to as "Our Channel Utilization Invention." The method of Our Channel Utilization Invention comprises varying the formation of the multiplex of the different program streams to reduce the memory requirement of the decoder buffers, varying including adjusting the relative alignment of the program streams. Different embodiments of adjusting include inserting program material such as a pause at selected points in time, causing decoder buffer underflow at selected points in time, and varying the rate of decoding and display at selected points in time.

The methods of Our Multiplexing Invention and Our Channel Utilization Invention do not reduce the quality of the pictures transmitted. There may still be situations in which these methods are not sufficient or cannot be used. In such situations, it may be necessary to reduce the amount of data at selected points in time in order to avoid exceeding the capacity of the channel.

Thus, there is a need in the art for technology that can be used to modify encoded video programs, in particular VBR-encoded programs, in order to reduce the data rate fluctuations in such programs without significantly affecting the image quality.

Thus, there also is a need for technology for modifying encoded video that reduces data rate fluctuations when transmitting a stream of a multiplex of several encoded video programs, applicable to both real time encoding and remote encoding situations.

Thus, there also is a need for technology for modifying encoded video that eliminates the chance of a buffer overflow condition occurring at the decoder.

Thus, there also is a need for technology for modifying encoded video that maximizes channel efficiency.

Thus, there also is a need for technology for delivering the information that is removed from the encoded video by modifying to certain receivers capable of extracting and utilizing the information to deliver improved image quality.

II. SUMMARY OF THE INVENTION

A. Objects of the Invention

Thus, an object of the invention is to provide a method (and apparatus) for modifying encoded video programs, in particular, VBR-encoded programs, to reduce the data rate fluctuations in such programs without significantly affecting the quality of programs.

Another object of the invention is to provide a method (and apparatus) for modifying encoded video that reduces data rate fluctuations when transmitting a stream of a multiplex of several encoded video programs, applicable to both real time encoding and remote encoding situations.

Another object of the invention is to provide a method (and apparatus) for modifying encoded video that reduces the chance of a buffer overflow condition occurring at the decoder.

Another object of the invention is to provide a method (and apparatus) for modifying encoded video that reduces the chance of a buffer underflow condition occurring at the decoder.

Another object of the invention is to provide a method (and apparatus) for modifying encoded video that maximizes channel efficiency.

Another object of the invention is to provide a method for sending the information removed by modifying in such a way that it can be recovered by certain receivers equipped with additional storage capacity and utilized to deliver improved image quality.

Another object of the invention is to provide a method for sending the information removed by modifying in such a way that it can be recovered by certain receivers with access to a second data channel and utilized to deliver improved image quality.

B. Overview of the Invention

The above and other objects of the invention are provided for in a method (and apparatus) for increasing channel utilization for a data channel transmitting a multiplex of a set of one or more encoded program streams, each program stream in said set being decodeable by a corresponding decoder, each corresponding decoder including a corresponding decoder buffer, the decoder buffers having a maximum allowable size, the method comprising selecting encoded pictures to be modified, said selecting according to a criterion which includes preventing any underflow of any decoder buffer, modifying each said selected encoded picture to form a corresponding modified encoded picture, said modified encoded picture having less data than said selected encoded picture, and transmitting the corresponding modified encoded pictures through the channel in place of the selected encoded pictures. In one embodiment, modifying deletes each selected encoded picture. In another embodiment where the encoded program streams include predictively encoded pictures, selecting selects predictively encoded pictures that are not anchor pictures, and modifying deletes the prediction error data from each said selected encoded picture.

In a further embodiment of the present invention, one or more additional data channels are used to send augmentation information. The augmentation information can be used by specially equipped receivers to correct the impairments that would normally occur when decoding the modified signal received from the data channel. In yet another embodiment of the present invention, augmentation information is sent using the same data channel that is used to transmit the modified pictures. In this case, the information that is removed by modifying is transmitted before it is needed for decoding and at a time when the data channel is not fully utilized. Certain receivers equipped with sufficient storage can receive and store the augmentation information until it is needed. Alternatively, if the additional storage is used to insert additional delay between the time that data is received and the time that data is decoded, then the augmentation information can be sent after it would be needed by a conventional receiver.

C. Related Inventions

Co-pending with the present application are our U.S. patent application Ser. No. 08/560,219 entitled "Method and Apparatus for Multiplexing Video Programs for Improved Channel Utilization" and application Ser. No. 08/561,410 entitled "Method and Apparatus for Increasing Channel Utilization for Digital Video Transmission," both filed concurrently with the present application, and incorporated herein by reference.

II. BRIEF DESCRIPTION OF THE DRAWINGS

FIG. 4(A) shows a B-picture before modifying.

FIG. 4(B) shows a typical B-picture after modifying the B-picture of FIG. 4(A) according to the method of the invention. Modifying discards DCT coefficients, so that the macroblocks of the slices in the B-picture of FIG. 4(A) are replaced with shorter macroblocks.

FIG. 5(A) shows: (i) a typical MPEG-2 macroblock before modifying and (ii) after macroblock modifying, including the removal of the DCT coefficients according to the method of the present invention.

FIG. 5(B) shows an MPEG-2 macroblock before and after modifying according to the method of the present invention in the case that the macroblock was intra-coded and the assumed value of quantizer_scale was erroneous so that a new value of quantizer_scale needed to be inserted.

IV. DESCRIPTION OF THE PREFERRED EMBODIMENT

A. Introduction

Figure 1:
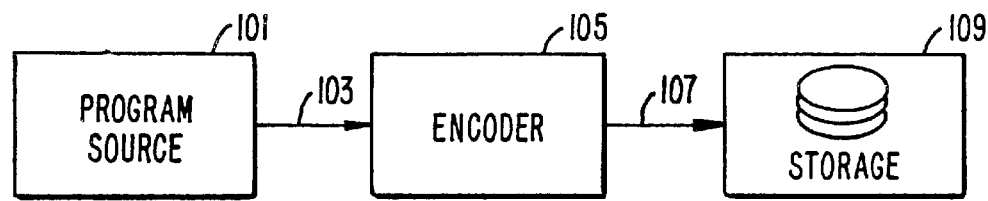
FIG. 1 shows an example of an encoding system.

The preferred embodiment of the invention utilizes the presently known technique of variable bit-rate ("VBR") encoding and decoding of video data, including soundtrack or audio data, and uses a compression method to reduce the total amount of data required to represent a video stream. The present invention, however, is applicable also to non-VBR encoded data, as would be clear to one in the art. Although the preferred embodiment uses the MPEG coding standard, the invention is applicable to many other coding methods, as also would be apparent to one in the art.

The following detailed description is made with reference to FIGS. 1–10, in which like reference numerals indicate identical elements throughout all of the figures.

For convenience, several terms used in describing the invention are defined in the Appendix entitled "An Introduction to Video Coding and MPEG." The Appendix also explains many of the concepts of coding and MPEG that may be needed to understand the presented invention. It should be noted that some of the terms in the terminology section of the Appendix may have more than one meaning in the art. The meaning applicable in this description would be clear from the context to one in the art.

B. Overall Architecture of the Preferred embodiment

The invention deals with complete coded streams, including both video and audio. The preferred embodiment deals with MPEG streams of a single program. That is, MPEG encoded video, audio, and other data are combined together as the MPEG stream of a single program. Such an MPEG stream is defined herein as a program stream.

Sometimes, details are provided herein only for dealing with the video stream component of the program stream, as it is the determining or limiting part. In any such case, how to process coded audio to be consistent with the method of the present invention would be straightforward to one in the art. Also, in all cases, realizing the present invention for streams coded by methods other than MPEG would be straightforward to one in the art.

An example of a video encoding system is shown in FIG. 1. Program source 101, such as a video tape recorder (VTR) or other program source, is used to supply uncompressed video 103 to an encoder 105. Encoder 105 receives uncompressed video 103 and applies a video compression process. In the preferred embodiment, the video compression is that specified by the MPEG-2 standard. It is preferred, but not necessary for the invention, that the video compression technique provides for a VBR mode that can be used to produce video streams which can be decoded to obtain images of substantially uniformly consistent quality. Many compression methods and standards, including MPEG, have such a VBR mode. Typically, the compressed output 107 of encoder 105 would be written to a digital storage medium (DSM) such as a disk or tape storage media 109 for playback at a later time, or transmitted directly to a data channel for broadcast or other transfer. That is, in the nomenclature of the MPEG standard, 109 is a DSM or channel.

Figure 2A:
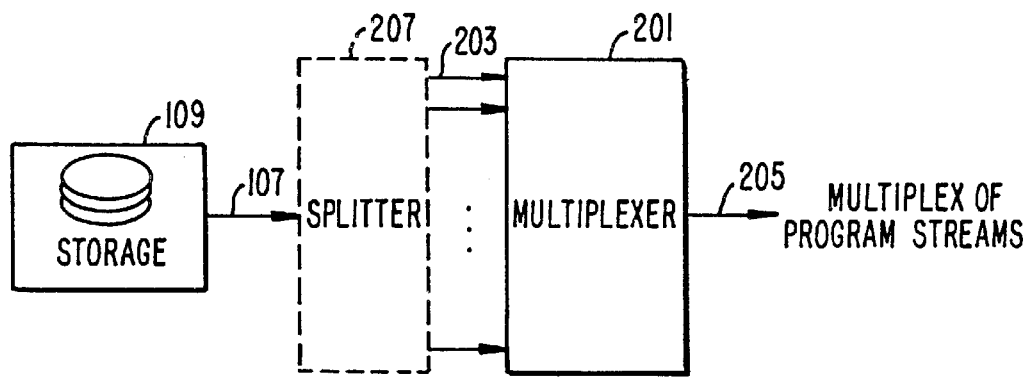
FIGS. 2A and 2B show systems for combining multiple compressed program streams into a single multiplex.
Figure 2B:
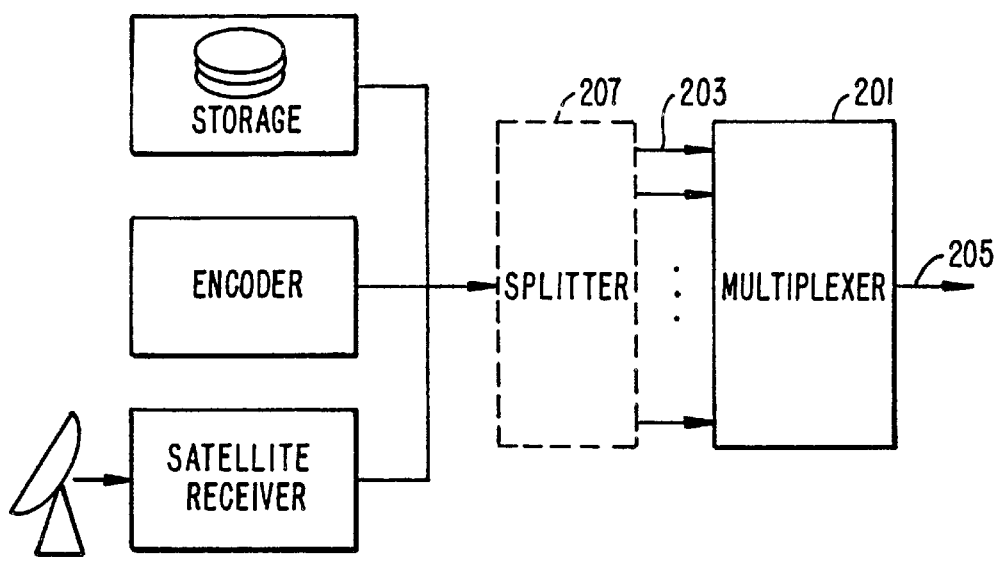

In the preferred embodiment of the present invention, multiple ompressed program streams are combined into a single multiplex as shown in FIGS. 2(A) and 2(B). The multiplexer 201 combines each of the rogram streams 203 retrieved from storage 109 or obtained from any other source, such as an encoder 209 and/or satellite receiver 211, into a single multiplex 205 that can either be broadcast immediately over the distribution system or returned to storage for broadcasting at a later time. One advantage of using the multiplexing process and apparatus, also called the combining process and apparatus, is to reduce the statistical variance in the video as compared to that of the individual VBR program streams 203. Additionally, the multiplexing method has the advantage of providing the viewer with a choice of retrieving or viewing any of the program streams contained in multiplex 205.

The multiplexing in the preferred embodiment is for a plurality of compressed program streams or for the case of transmitting several segments of a single data steam, such as a VBR or otherwise compressed program. In the single data stream case, one first partitions the compressed program into a plurality of segments using the splitter 207 shown in FIG.

2(A). For example, some or all of program streams 203 combined by the multiplexer 201 could correspond to different segments of the same video program. By continuously transmitting the same multiplex of program segments over and over, it becomes possible for the receiver to eventually reconstruct the entire program by selecting and decoding a different program segment during each repetition of the multiplex. This technique is described in more detail in our co-pending U.S. patent application, application Ser. No. 08/326,511, filed Oct. 19, 1994 entitled "Method and Apparatus for Encoding and Formatting Data Representing a Video Program to Provide Multiple Overlapping Presentations of the Video Program," hereinafter referred to as "Our Video-On-Demand Invention" and incorporated herein by reference. One application of Our Video-On-Demand Invention is video-on-demand, where the user may choose to begin watching a program during any of a wide range of time intervals.

Figure 3:
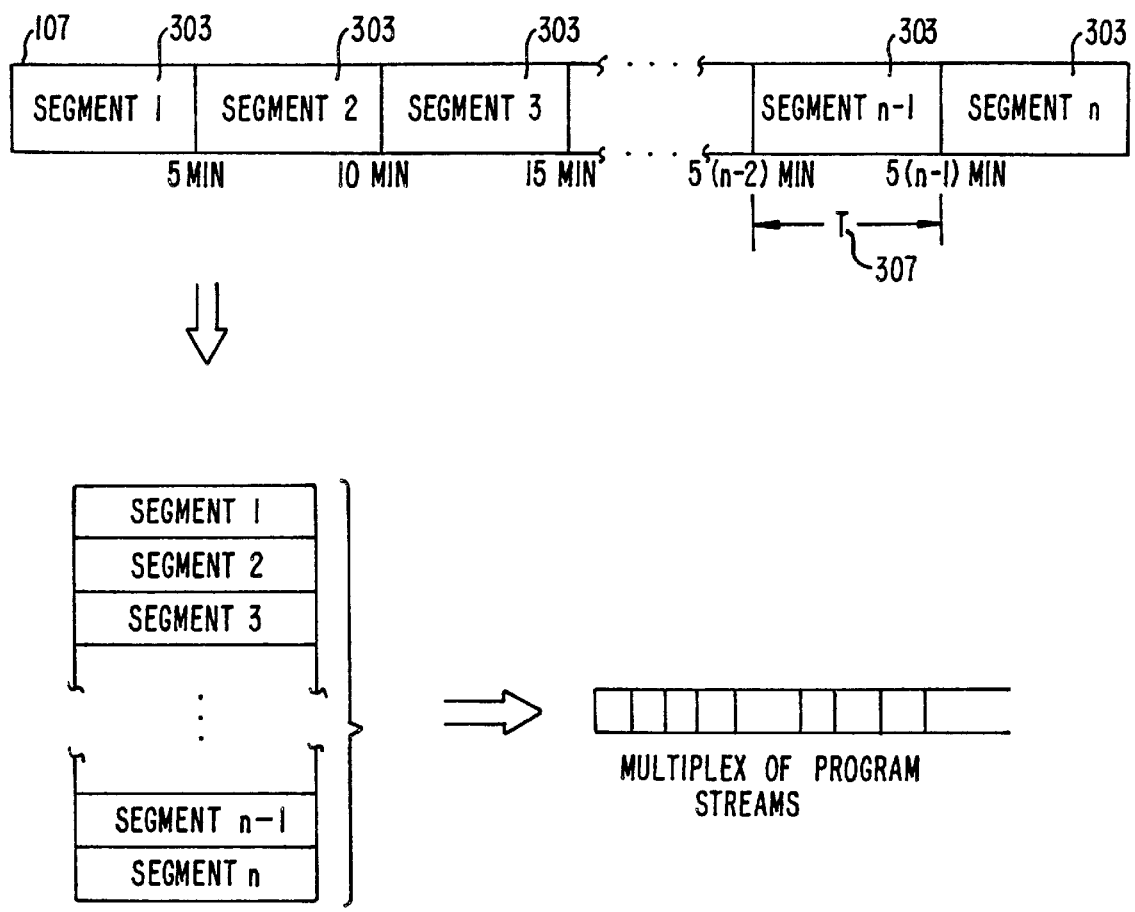
FIG. 3 shows the details of the video program stream, the n different segments, and the multiplexer output.

The splitting and multiplexing are shown in more detail in FIG. 3 for the case where program streams 203 correspond to different segments of the same video program and multiplexed output 205 is a multiplex of such different segments of the same video program. In the preferred embodiment of the present invention for the single original stream case, compressed program 107 is first split into a number, n, of segments 303 where each segment 303 corresponds to a fixed time interval 307 of length T seconds. In the example illustrated in FIG. 3, T, the time interval 307, is 300 seconds (5 minutes). When segments 303 are compressed using VBR techniques, the compression ratio is allowed to vary over time, and different segments may contain differing amounts of compressed data.

As shown in FIG. 3, in the segmented single-stream case, each of the n different segments 303 becomes an independent program stream, and each of these n independent program streams subsequently are aligned to start at the same time, herein referred to as "stacking up." The stacked-up program streams 203 are multiplexed together using multiplexer 201.

Making the necessary changes for the case of multiplexing several video programs rather than segmenting a single stream before multiplexing would be clear to one in the art. Similarly, changing for the hybrid case of multiplexing together segments of one or more programs with one or more independent video programs would also be clear to one in the art.

In the preferred embodiment, the multiplexing method used is that of Our Multiplexing Invention. The method assumes that all receivers that are "tuned" to a particular program stream use the same hypothetical decoder. Each such decoder has a single buffer to receive data from a single selected stream. Thus, when sending data from a particular program stream, the multiplexing method in the preferred embodiment effectively assumes the data will be sent along a particular communications channel including the tuned hypothetical decoder. The method of Our Multiplexing Invention uses this assumption, for example, to estimate the fullness of the buffer of the hypothetical decoder corresponding to any stream to which the receiver containing the decoder is tuned. The word "receiver" as used herein means a receiving device which includes a decoder. The term "channel buffer" refers to this decoder's buffer. The assumption about such hypothetical decoders does not necessarily restrict the type of decoders or receivers with which the method of the present invention works. Rather, the assumption is used by the multiplexer to make certain decisions. Different levels of modeling the decoders are possible within the scope of the invention.

In Our Multiplexing Invention, each of the program streams 203 is assumed to have been subdivided into packets prior to multiplexing. Each time a packet is sent, the multiplexer selects the next packet by determining which of the decoder buffers corresponding to the n different channels will become empty first. The complexity of the determining step depends on how complete a model of decoders is maintained at the multiplexer. The more complete the model, the less computation is involved in determining which channel to send to. The method of Our Multiplexing Invention determines the order of sending data packets of program streams into the data channel. Whenever data is to be sent, the method determines which packet to send next by selecting a next channel that has a decoder buffer that is not approaching a full state. The method further includes selecting a channel that substantially balances the decoder buffers of the decoders with which the program streams are decodeable. In a further feature of that embodiment, balancing the decoder buffers includes keeping approximately the same time duration stored in each decoder buffer.

Although the method of Our Multiplexing Invention is used in the preferred embodiment, those in the art will appreciate that the present invention is applicable also to all other multiplexing methods and also to sending single (non-multiplexed) program streams and other digital video streams.

In many situations, the data rate of the resulting multiplex may exceed the capacity of the transmission channel even when optimal multiplexing techniques are used. The method of the present invention modifies the resulting multiplex to fit into such data channels by introducing slight impairments to the image quality. The impairments are of a type and nature that they are not likely to be detected under normal viewing conditions. Thus the method of this invention maintains constant perceived image quality.

In a further embodiment of the present invention, one or more additional data channels are used to send augmentation information. The augmentation information can be used by specially equipped receivers to correct the impairments that would normally occur when decoding the modified signal received from the first data channel. For example, in satellite transmission, the method of the present invention can be used to transmit several program streams by satellite. Each satellite provides several transponders in both the uplink and downlink paths. Using the method of the present invention, the modified signal is transmitted using a first transponder, and the information removed by modifying is transmitted using a second transponder having spare capacity.

In yet another embodiment of the present invention, augmentation information is sent using the same data channel that is used to transmit the modified signal. In this case, the information that is removed by modifying is transmitted before it is needed for decoding and at a time when the data channel is not fully utilized. Certain receivers equipped with sufficient storage can receive and store the augmentation information until it is needed. Alternatively, if the additional storage is used to insert additional delay between the time that data is received and the time that data is decoded, then the augmentation information can be sent after it would be needed by a conventional receiver. The increased delay in the path of the enhanced receivers would allow sufficient time to receive the augmentation information and apply it to the decoding process at the appropriate time.

C. Detailed Description

As stated earlier, even with statistical multiplexing and the method of Our Multiplexing Invention, there is still a finite chance that all program streams have scenes at the same time of such complexity that the capacity of the transmission channel is exceeded and the data cannot be delivered in time to prevent the decoder buffers from underflowing. Often, in such cases, the method of Our Channel Utilization Invention can be used to prevent such large data rate fluctuations while preserving the full quality of the encoded video.

The method of the present invention includes the modification of the signal that is transmitted by reducing the amount of data whenever necessary to avoid exceeding the capacity of the channel. The method can be used in conjunction with the method of Our Channel Utilization Invention, or alone. Reducing the amount of data is done, according to the present invention, by selectively increasing the compression ratio during certain complex scenes, thus affecting image quality. Depending on the particular compression method to which this is applied, the method of the present invention chooses particular portions of the program to decompress and recompress. It is known in the art that the human eye is less sensitive to artifacts, such as compression artifacts, in parts of a picture that have complex motion or that are fast moving. That is, in the case of using motion prediction, in those parts of a picture where the motion prediction method is not particularly accurate in prediction. This is known in the art as the "masking affect." According to the method of the present invention, the choosing of particular portions of the program to decompress and recompress uses the masking effect.

In the preferred embodiment of the invention, MPEG is used for compression. MPEG uses motion prediction, and as described in the Appendix, pictures are classified in MPEG into three types. I-pictures use only spatial techniques for coding. P-pictures use forward prediction from a previous anchor picture (a P- or I-picture), followed by spatial coding to compress the differences between the picture and the predicted picture, and B-pictures use bidirectional prediction from a pair of anchor pictures followed by spatial coding. In general, P-pictures can be compressed more efficiently than I-pictures, since the prediction errors tend to contain less information than the original images. B-pictures are usually the most efficiently-compressed images because they use predictions based on information contained in a previous picture, a future picture, or both. Since the bidirectionally-derived predictions are usually more accurate than unidirectionally-derived predictions, greater compression ratios are possible in the spatial compression step with B-pictures. Sometimes, however, during detailed scenes with complex motion, the advantages of bidirectional prediction are reduced and the B-pictures become more difficult to compress.

Another distinguishing characteristic of B-pictures is that they are never used to predict other frames of the sequence. Therefore, if a B-picture is deleted or altered, the effect will be confined to that picture alone and will not cause any alteration of other pictures in the video sequence yet to be decoded. Therefore, in accordance with the method of the present invention, post-processing techniques aimed at reducing peak data rates are limited only to data that does not affect the image quality of other video frames. In the case of MPEG, such post-processing is limited in the preferred embodiment to the B-pictures only. In this way, any impairments or artifacts introduced into a sequence will be limited to very short durations corresponding to a single frame time interval. As a result, such impairments will become difficult to detect visually, particularly if they are strategically confined to regions characterized by rapid, random, or complex movements (the masking effect). These are the regions which are difficult to reproduce using previous and/or future frame predictors. Sometimes, accurate reconstruction in these regions is accomplished by sending intra-coded or spatially-compressed information that is not based on prediction errors.

Thus, according to the method of the present invention, lowering peak data rates is accomplished by reducing or eliminating prediction-error information in selected B-pictures. In one embodiment, the visual masking effect is increased by only altering pictures that are separated by a certain minimum time-interval. For example, the number of altered pictures may be limited to no more than one out of every group of twelve consecutive pictures. Recalling that multiplex 205 may contain many program streams 203, the method of the invention may individually alter each of the streams during periods when the nominal data rate is being exceeded. An additional advantage of the method is that it is relatively straightforward to implement in real time. Additionally, it does not require reconstruction of the pixel-data.

In another embodiment, for any program stream, for B-pictures that are separated enough, the prediction-error information is first identified by parsing the compressed bit-stream. A B-picture is selected for processing if the energy in all the DCT coefficients is sufficiently large. This corresponds to either a B-frame of a complex scene, or a B-frame in which there is a large prediction error. As discussed before, these situations are when the masking effect is strongest. That is, errors are not easily perceived in the display. Thus, selecting such B-pictures for modifying still retains the property of constant perceived quality in the modified bit stream Once B-pictures are selected, in one embodiment of the present invention, the spatially-coded prediction-error data (the DCT coefficients) sent with such selected B-pictures is discarded. As will be clear to those in the art, additional code words may need to be adjusted in order to indicate the absence of this prediction-error data.

In an alternate embodiment, the B-pictures selected are simply deleted.

The process of modifying MPEG B-pictures according to the preferred embodiment will now be described in detail with the aid of FIGS. 4A, 4B, 5A and 5B. FIG. 4A shows a B-picture before modifying. The picture consists of a picture header 403, and several slices, that number denoted by N. Each slice, for example, the first slice 405 and the last slice 407, has a slice header (slice header 409 in the case of the first slice) followed by a number, M, of macroblocks, each macroblock denoted by $MB_{ij}$ for the j'th macroblock in the i'th slice. For example, in the first slice, slice header 409 is followed by the first macroblock 411, denoted by $MB_{11}$, followed by the next macroblock, etc., through to the last macroblock 413, denoted by $MB_{1M}$. Similarly, in the last slice, slice header 415 is followed by the first macroblock 417, denoted by $MB_{N1}$, followed by the next macroblock, etc., through to the last macroblock 419, denoted by $MB_{NM}$. Modifying according to the method of the invention, discards the DCT coefficients that are present in some of the macroblocks. FIG. 4(B) shows the B-picture of FIG. 4(A) after modifying. Each macroblock, denoted by $M\overline{B}_{ij}$ for the j'th macroblock in the i'th slice, is a shorter version of corresponding macroblock $MB_{ij}$ of the picture in FIG. 4(A), except that some of the original macroblocks may not have contained DCT coefficients, and some of the original macroblocks may have been skipped. Skipped macroblocks are not affected by the modifying method of the present invention.

How each macroblock is modified, according to the preferred embodiment, is described with the aid of FIG. 5(A), which shows a typical MPEG-2 macroblock 501 before modifying and the modified macroblock 503. MPEG-2 macroblock 501 contains several components defined by the macroblock layer syntax of the standard. The macroblock_address_increment is an integer, represented by a variable length code, which indicates how many macroblocks have been skipped to arrive at the present macroblock. The macroblock_escape component is used together with the macroblock_address increment to determine the total when a large number of blocks has been skipped. The macroblock_type indicates, using a variable length code, the type of macroblock. Different types are modified in different ways according to the preferred embodiment, as described below and as shown in Table I, where, for convenience, the variable length codes are represented by integers. The motion_type, for example frame_motion_type or field_motion_type in MPEG-2, is a code indicating the type of motion prediction. The DCT_type is a code indicating whether the DCT is field coded or frame coded. The quantizer_scale is an integer used to scale the reconstruction level of the retrieved DCT coefficients. The motion vector or vectors are used for motion compensation and may be of a different type depending on the macroblock_type, motion_type, and other parameters, and typically will include vertical and horizontal vector components for both forward and backward prediction. The coded_block_pattern defines, for this macroblock, to which blocks the DCT coefficients belong. For example, the coded_block_pattern defines which luminance and chrominance blocks, within the macroblock, contain non-zero DCT coefficients. The DCT coefficients, for these blocks specified by coded_block_pattern, follow next in the bit stream and, according to the method of the present invention, are subsequently deleted.

Depending on the macroblock_type and other codes from other layers in an MPEG-2 stream, some of this data may not be present in all macroblocks. In particular, macroblock_escape, motion_type, DCT_type, quantizer_scale, the motion vector or vectors, and or coded_block_pattern are not always present.

Table I indicates some properties of macroblocks having different macroblock_type codeword values. For convenience, the macroblock_type codeword is shown as a number rather than a variable length codeword. Table I shows the new macroblock_type codeword to insert according to the preferred embodiment of the method of the present invention. Table I also shows different coding features according to the macroblock_type. These features are macroblock_quant (shown by Quant and indicating that a new quantizer_scale is being sent), macroblock_motion_forward (shown by Motion_forward, and indicating that forward prediction is used), macroblock_motion_backward (shown by Motion_backward, and indicating that backward prediction is used), macroblock_pattern (shown by Pattern and indicating that coded_block_pattern is being sent), and macroblock_intra (shown by Intra and indicating that the data is intracoded).

FIG. 5(A) shows the macroblock 503 which results from modifying the macroblock 501 in the case where DCT coefficients are discarded. The macroblock_escape and macroblock_address_increment are unchanged, the macroblock_type is modified according to Table I, the motion_type remains unchanged, the DCT_type and the quantizer_scale are discarded since no DCT coefficients are sent, the motion vectors remain unchanged, and the coded_block_pattern is discarded, as are the DCT coefficients. A variation of this preferred embodiment is to delete the motion vectors in addition to the DCT coefficients. This would further reduce the amount of data to be transmitted but would degrade the accuracy of the prediction, and therefore the image quality, in most regions of most images.

In the preferred embodiment of the present invention, the DCT coefficients are not deleted during modifying for intra-coded macroblocks, that is, for macroblocks with macroblock_type 7 or 11. Instead, the intra-coded macroblock is sent unchanged in all cases except in the case that the quantizer_scale has changed since the last intra-coded macroblock was sent, and the current quantizer_scale does not reflect such a change. This might happen, for example, if the intra-coded macroblock is of macroblock_type 7 and the changed values of quantizer_scale were to be sent in a previous macroblock which was modified according to the method of the present invention, such modifying removing the quantizer_scale. In such a case, as shown FIG. 5(B), the macroblock 501 of macroblock-type 7 is replaced with a macroblock 503 of macroblock_type 11, and the new value of quantizer_scale is inserted into macroblock 503.

TABLE I

| Type | Quant | Motion_forward | Motion_backward | Pattern | Intra | New type |
|---|---|---|---|---|---|---|
| 1 |  | x | x |  |  | 1 |
| 2 |  | x | x | x |  | 1 |
| 3 |  |  | x |  |  | 3 |
| 4 |  |  | x | x |  | 3 |
| 5 |  | x |  |  |  | 5 |
| 6 |  | x |  | x |  | 5 |
| 7 |  |  |  |  | x | 7 or 11* |
| 8 | x | x | x | x |  | 1 |
| 9 | x | x |  | x |  | 5 |
| 10 | x |  | x | x |  | 3 |
| 11 | x |  |  |  | x | 11 |

One variation of the preferred embodiment is to convert intra-coded macroblocks to predictive-coded macroblocks. A simple method for performing the conversion is to substitute the macroblock_type from 7 or 11 to 1. As shown in Table I, macroblockl_type 1 corresponds to a bidirectionally-predicted macroblock where the motion vectors are assumed to have a magnitude of zero. The prediction may not be very accurate in this case, but the resulting artifacts are likely to be difficult to detect in such regions where the original encoder determined that intra-coding was more effective than predictive-coding. No additional motion vectors, DCT coefficients, or other codewords are expected when this type of macroblock is specified.

Figure 6:
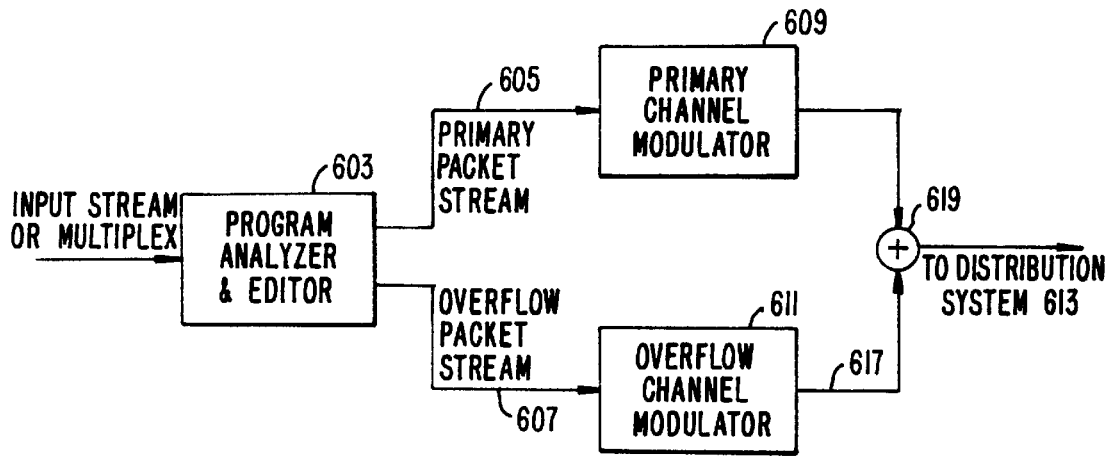
FIG. 6 shows an embodiment of an encoding system for implementing the B-picture modifying process of this invention.

A preferred system for implementing the B-picture modifying process is shown in FIG. 6. A program analyzer and modifier 603 receives one or more encoded program streams, depending on whether the method is to be applied to a single program or to an entire multiplex. In this example, the program analyzer and modifier 603 selects the B-pictures to be modified, performs the modifying using the preferred method described previously, assigns the modified B-picture packetized data and the packetized data of all other unmodified pictures to a primary output stream 605, and assigns the original unmodified packets corresponding to each selected B-picture to an overflow output stream 607. In this example, the primary and overflow stream data are modulated by the primary modulator 609 and overflow channel demodulator 611, respectively, onto different RF channels 615 and 617, respectively, and combined by combiner 619 for distribution. In larger systems, additional flexibility and efficiency can be gained by sharing one or more overflow channels among multiple primary channels.

The output 617 of FIG. 6 is compatible with conventional receiver systems capable or receiving only one RF channel. Such receivers would only decode the data in the primary channel, and therefore would experience some, albeit imperceptible or almost imperceptible degradation in image quality when the modified B-pictures are encountered.

Figure 7:
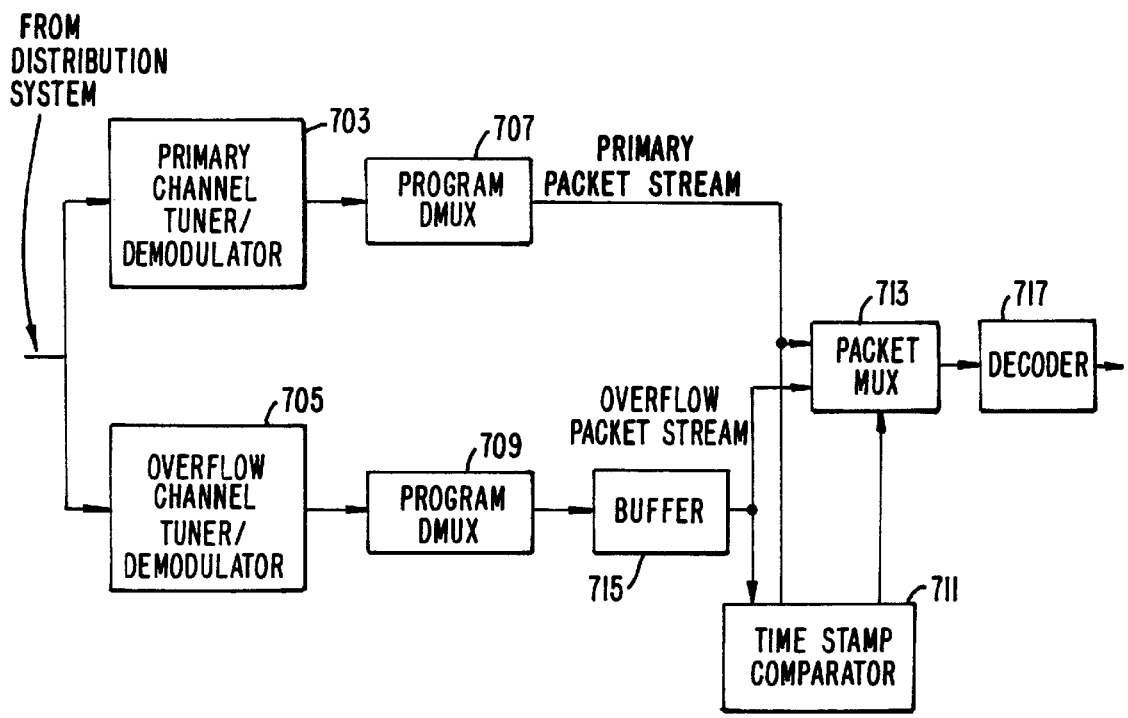
FIG. 7 shows an embodiment of an enhanced receiver, capable of receiving data from both the primary channel and the overflow channel of the system of FIG. 6.

An example of an enhanced receiver, capable of receiving data from both the primary channel and the overflow channel, is shown in FIG. 7. A first tuner/demodulator 703 demodulates the data from the primary channel and a second tuner/demodulator 705 demodulates the data from the overflow channel. The output of each tuner/demodulator is provided to a program DMUX which extracts the desired program stream from each of the respective multiplexes. In FIG. 7, the primary channel and overflow channel program DMUX's are labeled 707 and 709, respectively. The output of each program DMUX is provided to a time stamp comparator 711 which instructs a packet MUX 713 to select a next packet from the primary stream if the associated time stamp is less than the time stamp corresponding to the next packet from the overflow stream. In such cases, the packet from the overflow stream is saved in a small buffer 715 and then compared once again with the following packet in the primary stream. Eventually, when the time stamps of the corresponding next packets are identical, the packet MUX 713 is instructed to select the next packet from the overflow stream and the corresponding primary stream packet is discarded. In this way, the full quality of the original encoded signal is preserved, since the decoder in the enhanced receiver only receives packets corresponding to unmodified pictures.

Figure 8:
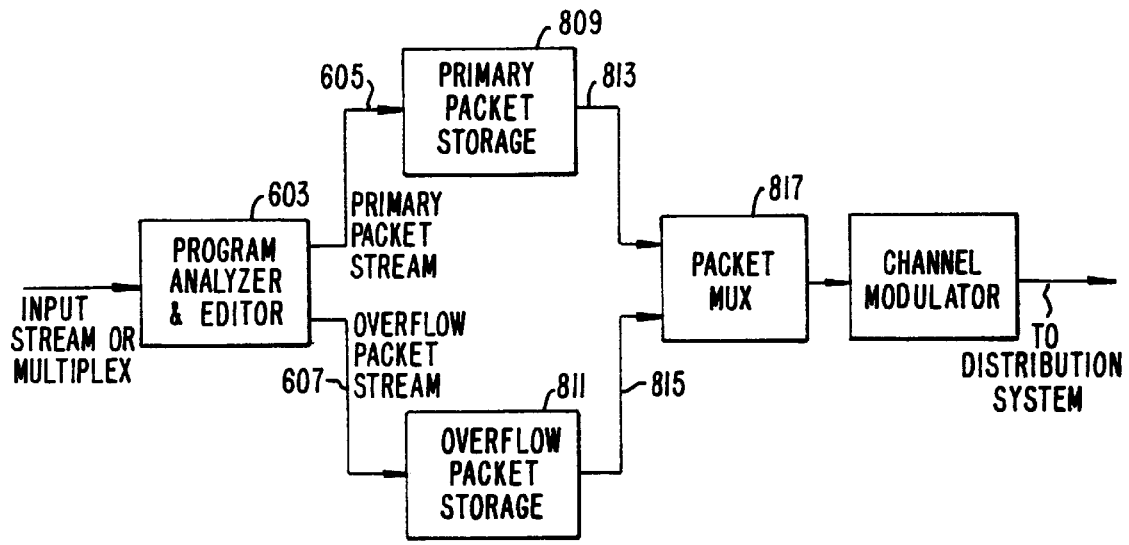
FIG. 8 shows an alternate encoding system for implementing the B-picture modifying process of this invention.

A slightly different encoding system is shown in FIG. 8. Like the system of FIG. 6, this uses a program analyzer and modifier 603 which outputs the primary and overflow packet stream outputs, 605 and 607, respectively. In this case, outputs 605 and 607 from the program analyzer and modifier 603 are connected to respective packet storage systems 809 and 811, respectively. These storage systems are arranged as first-in-first-out (FIFO) storage devices. Once a sufficient amount of data has collected in the overflow packet storage device 811, the packets from the respective storage devices can begin to be multiplexed. The packet MUX 817 in FIG. 8 normally selects packets 815 from the primary packet storage device 811 and only inserts packets 813 from the overflow storage device 809 when sufficient channel capacity is available. In this way, the overflow packets 815 are inserted and used in the same way as fill packets which are no longer needed unless the overflow packet storage device 811 becomes empty. Thus this systems avoids whenever possible sending fill packets, and thus increases channel utilization.

Figure 9:
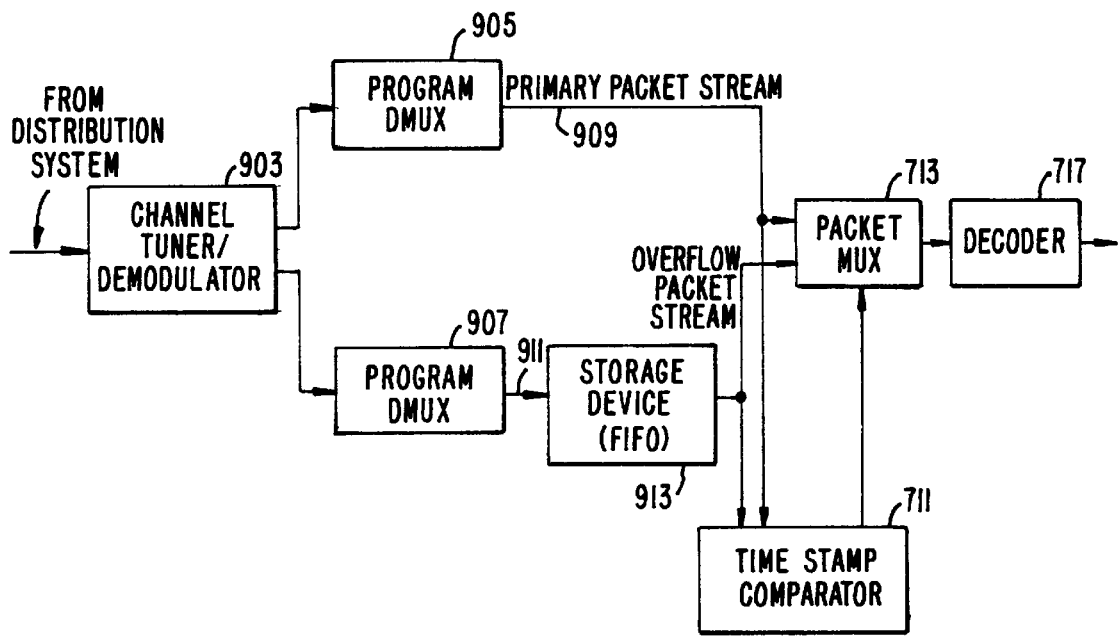
FIG. 9 shows an embodiment of an enhanced receiver, capable of receiving data from both the primary channel and the overflow channel of the system of FIG. 8.

As before, the output produced by the encoding system in FIG. 8 is compatible with conventional receivers, which ignore the overflow data packets embedded in the bit stream. However, an enhanced receiver, which includes sufficient local storage, can utilize both the primary and the overflow packets to reconstruct the original encoded bit stream as it existed before the B-pictures were modified. An example of such an enhanced receiver is shown in FIG. 9. In this case, after demodulation by a channel tuner/demodulator 903, a first program DMUX 905 extracts all primary packets 909 while a second program DMUX 907 extracts all overflow packets 911 associated with the same program. The overflow packets 911 are transferred to a FIFO storage device 913 where they are delayed until needed for decoding. As in the system of FIG. 7, a time stamp comparator 711 compares the time stamp of the next primary packet with the time stamp of the next overflow packet from the FIFO storage device 913 and selects the one with the smallest associated time stamp. If both packets have the same time stamp, then the overflow packet from the storage device 913 is selected and the primary packet is deleted. In this way, the full quality of the original encoded signal is preserved, since the decoder 717 in the enhanced receiver only receives packets corresponding to unmodified pictures.

A particular embodiment of the operation of the program analyzer and modifier 603 is now described with reference to FIG. 10. To simplify the explanation, a one-to-one correspondence between packets and pictures will be assumed. Those skilled in the art will recognize that packets generally are not aligned with picture boundaries and may be either larger or smaller than the size of the average picture. Those skilled in the art will also realize that all such packets which include even a small portion of an modified B-picture can be included in the overflow output stream, and also duplicated in the primary stream with the B-picture component of the packet subjected to the modifying process.

Figure 10:
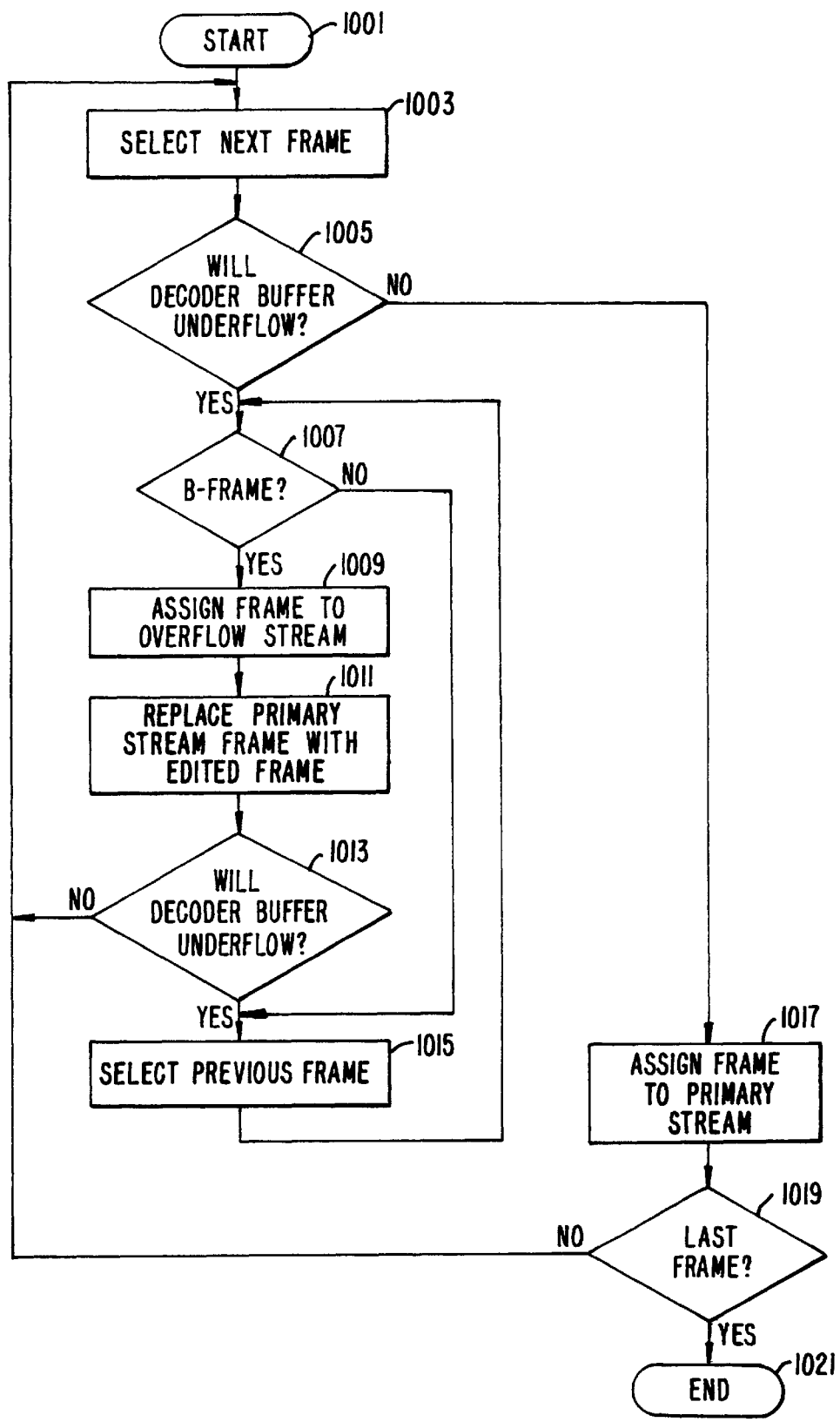
FIG. 10 shows a flow chart for an embodiment of the method for analyzing a program stream to determine when to modify B-pictures, according to the present invention.

Referring to FIG. 10, the method starts with step 1003, in which the next picture is selected. In the case of a single program stream, Several methods can be used to select the next picture. In the preferred embodiment, the method of Our Multiplexing Invention is used for step 1003. The reader is referred to FIG. 4(a) of the patent application for Our Multiplexing Invention for a flow chart of such a method, noting that the flow chart of that FIG. 4(a) is for packets rather than video frames.

After step 1003, step 1005 determine if the decoder buffer corresponding to the selected next picture will underflow. Step 1005 is done using time stamps in a manner analogous to the method described in the co-pending patent application for Our Channel Utilization Invention. The reader in particular is referred to the flow chart of FIG. 7 of that patent application. If it is determined in step 1005 that the corresponding decoder buffer will not underflow, the picture is assigned in step 1017 to the primary stream, and a determination is made, in step 1019, whether or not that was the last video frame. If that was the last picture, the method ends. If not, the method goes back to step 1003 to select the next picture.

If at step 1005, it is determined that the next picture would normally underflow the buffer, then, in the preferred embodiment of the method of the present invention, Step 1007 determines if the next frame selected in step 1003 is a B-picture. If step 1007 determined that the next picture is not a B-frame, then the pervious picture is selected in step 1015, and that picture is checked if it is a B-picture. When a B-picture is thus found, that picture is assigned to the overflow stream in step 1009, and n step 1011, the B-picture is modified, and the modified picture is assigned to the primary stream, replacing the B-picture assigned to the overflow stream. In step 1013, a determination is made if the decoder buffer will underflow with the modified primary stream, and, if not, the method returns to step 1003 to select the next picture. If there is an underflow the previous picture is selected, and the method returns to step 1007 to find the next previous B-picture to modify.

In an alternate implementation of the invention, rather than, as in step 1007, all possible B-pictures being candidates for modification, B-frames are selected for modification only if they contain a relatively large amount of data.

That is, only if there is a high prediction error. Selecting such B-pictures for modification ensures, according to the masking effect, that errors would not be easily perceptible.

Thus, in an alternate embodiment, groups of pictures rather than just pictures are considered. In the preferred embodiment of this alternate, each group consists of 12 pictures, that is, 0.5 seconds of a 24 frames per second movie. Using methods or simple modification of methods that have been disclosed herein or in our co-pending patent applications of Our Multiplexing Invention and Our Channel Utilization Invention, the process knows the state of all decoder buffers at any point in time. Also, the process knows the next group of pictures for any program stream at any point in time. Thus, at any point in time, the process determines the effect on the state of the decoder buffers of transmitting all these next groups of pictures for all programs streams. In particular, the program can determine if an underflow situation would occur. If no overflow condition would occur in any of the decoder buffers, the method sends this next group of pictures for all program streams and then looks at the next group of pictures for all channels.

If an overflow condition would have occurred, the method chooses rom all pictures in the next groups of pictures the B-frame which contains the most data—a good frame to modify with respect to the masking effect. That B-picture is modified, the unmodified B-picture is 1) assigned to the overflow stream, and 2) replaced in the primary stream with the modified picture. The method next checks if all groups of pictures can now be sent with no underflow condition occurring. If yes, they are sent, else, the B-picture which contains the next most data is selected for modification. This is repeated until a sufficient number of B-pictures have been modified to avoid the underflow condition.

An alternate embodiment, additional criteria may be added, such as not modifying B-frames that are too close together within a single program stream.

How to simplify either the embodiment described in the flow chart of FIG. 10, or the method of the alternate embodiment to deal with the case of there not being an overflow stream would be clear to those in the art.

Referring to the flow chart of FIG. 10, in a real-time implementation, it may not be practical to repeatedly select and modify previous pictures until the data rate is sufficiently reduced to match the capacity of the channel. In such real-time implementations, it may be necessary to halt the backward stepping process when necessary to maintain proper timing, and resort to alternative data rate reduction measures such as the controlled underflow technique described in Our Channel Utilization Invention.

Selectively modifying B-pictures can be done during formation of the complete multiplex. Alternatively, this can be generalized to selectively modifying B-pictures independently for each n program stream. Since modifying can be done independently for each of the program streams 203, the method of the present invention is applicable also to the case of modifying selected B-pictures in a single encoded stream when there is a single encoded stream to transmit to a decoder via a data channel. How to simplify either the embodiment described in the flow chart of FIG. 10, or the method of the alternate embodiment to deal with the case of there being only a single program stream would be clear to those in the art.

The co-pending patent applications for Our Multiplexing Invention (in FIG. 5) and Our Channel Utilization Invention (in FIG. 15) disclosed a server system capable of generating encoded multiplexes 205. Referring to FIG. 15 in the application for Our Channel Utilization Invention, editing of the compressed data streams, according to the present invention, can be performed in such a server system controller 1509. For example, if the compression ratio corresponding to a portion of a particular program is to be increased, then the steps for decompressing the selecting portion, re-compressing at a higher reduction ratio, and inserting the results back into the data stream can all be performed. Alternatively, complete or partially compressed programs to be used for data stream editing can be entered into the system via the encoder 1511 or archive library 1505.

In the case that unedited versions of B-frames are also sent in an "overflow" channel when there is B-frame editing according to the invention, a separate server module can store all edited B-frames of a program. When a multiplex is being formed using a MUX module 1513, a full B-frame is sent from the server module holding the program when the channel can accommodate the full B-frame. Otherwise, an edited B-frame is taken from the server module holding edited B-frames.

Optionally, whenever an edited B-frame is sent, a separate MUX module forms a separate multiplex that includes a stream containing the full versions of edited B-frames.

Thus, a method and apparatus has been disclosed for modifying encoded video for improved channel utilization for multiplexed digital video transmission.

The foregoing description of preferred and alternate embodiments of the invention has been presented for purposes of illustration and description. It is not intended to be exhaustive or to limit the invention to the precise forms disclosed. Obvious modifications or variations are possible in light of the above teachings. The embodiments are chosen and described to provide the best illustration of the principles of the invention and its practical application in order to enable one of ordinary skill in the art to utilize the invention in various embodiments and with various modifications, as are suited to the particular use contemplated. All such modifications and variations are within the scope of the invention as determined by the appended claims.

Appendix: An Introduction to Video Coding and MPEG

A. Terminology

For convenience, several terms used in describing the invention are now defined. The concepts behind the terms listed in this terminology section are explained in the sections that follow. It should be noted that some of these terms may have more than one meaning in the art. The meaning applicable to the description section would be clear from the context to one in the art.

MPEG: The MPEG standard, a set of International Organization for Standardization/International Electrotechnical Commission (ISO/IEC) standards. Two variations of MPEG have been agreed to;

MPEG-1, documented in ISO/IEC publications 11172 ("Coding of Moving Pictures and Associated Audio for Digital Storage Media"), and MPEG-2, documented in ISO/IEC publications 13818 ("Generalized Coding of Moving Pictures and Associated Audio Information"). As used herein, MPEG refers to either MPEG-1 or MPEG-2 without distinction.

Remote coding: Encoding programs independently of encoding of any other programs and independently of any multiplexing of the coded streams, either because of remote physical location, or for other reasons.

Frame: The basic unit of audio coding. MPEG audio bit-streams are broken down into frames. The term "frame" is also commonly used for the unit of a video sequence. A video frame often is referred to as a "picture" herein.

Picture: A video frame, the unit of a video sequence.

Pixel: A "picture element" of a picture. In the arts of digital video and video coding, a picture may be thought of as a discretized two-dimensional array of pixels.

Pel: A picture element. The same as a pixel.

Field: In video, a subset of the pixels of a picture transmitted separately. In interlacing, a picture is split into two or more fields. In NTSC and PAL, each field consists of the pixels in alternating horizontal lines of the picture.

Interlacing: The splitting of a picture into two or more fields.

Image coding: The art of image compression.

Color quantization: Reducing the number of bits in a pixel required to represent that pixel. Color quantization also means digitizing the numbers representing the colors of a pixel.

Intra-coding: Image coding which takes into account spatial redundancies in a picture, including color quantization, but which does not use temporal variations from picture-to-picture.

Inter-coding: Image coding, which takes advantage of temporal redundancies from picture-to-picture in a video sequence.

Intraframe coding: The same as intra-coding.

Interframe coding: The same as inter-coding.

Motion estimation.: Computing the spatial displacement due to motion from picture-to-picture in a video sequence.

Motion compensation: Using motion estimation to compensate for motion from picture-to-picture in a video sequence.

I-picture: In MPEG, a picture that uses purely intra-coding, and thus, is processed independently of other pictures I-frame: Same as an I-picture.

Intraframe coded picture: Same as an I-picture.

P-picture: In MPEG, a picture that is coded using a previous I-picture or a previous P-picture. The compression of P-pictures relies on temporal prediction from previous I- or P-pictures using forward motion estimation and compensation.

P-frame: Same as a P-picture.

Predictively coded picture: Same as a P-picture.

B-picture: In MPEG, a picture coded by a bidirectional motion estimation and compensation from a previous I- or P-picture and a future I- or P-picture.

B-frame: Same as a B-picture.

Bidirectionally coded picture: Same as a B-picture.

Anchor picture In MPEG, for a P-picture, the I-or P-picture used to predict the P-picture. For a B-picture, either of the adjacent I- or P-pictures, one forward, the other backward in time from the B-picture, used to predict that B-picture backwards and forwards in time, respectively.

Reference pictures: The same as anchor pictures.

Reference frames: The same as anchor pictures.

Variable bit-rate(VBR) encoding: Image coding which the output bitrate varies over time to account for the different complexities of the original video scenes from time to time. VBR encoding often is associated with encoding to achieve a uniform picture quality.

MPEG stream: In MPEG, a bit-stream typically containing one or more video streams multiplexed with one or more audio streams and other data, such as timing information.

Program stream: A coded stream for a single video program, usually comprising all video, audio, and other data streams associated with that program. An example is an MPEG stream for a program.

Elementary stream: In MPEG, a video stream, audio stream, or private data stream.

Video stream: The bit-stream of coded video information.

Audio stream: The bit-stream of coded audio information.

Packet: In MPEG, the basic unit of an elementary stream. Packets include a packet header and packet data.

Packet header: In MPEG, a header in each packet. The packet header includes a stream identification code and may include one or more time-stamps.

Pack: In MPEG, the basic unit of MPEG streams. Each pack includes a pack header and packets from one or more elementary streams.

Pack header: In MPEG, the header of a pack, possibly including time stamps.

Time-stamps: In MPEG, information in packs or packets which provide means for synchronization during decoding and presentation to the viewer.

Multiplex-wide operators: In MPEG, operations performed in decoding on packs, including the coordination of retrieval off the DSM or channel, the adjustment of clocks, and the management of buffers.

Stream-specific operations: In MPEG, operations performed in decoding on one elementary stream, including demultiplexing and playback synchronization.

DSM: A general term for Digital Storage Medium, used to denote a digital storage or transmission device or system. In the case of encoding, coded data is sent to a DSM or to a data channel, and, in the case of decoding, coded data is obtained from a DSM or from a data channel.

Source clock reference (SCR): In MPEG, data which might be present in a pack header used to adjust local clocks to a master time base.

Decoding time-stamp (DTS): In MPEG, data that may be present in a packet header which indicates the time that the first unit in the packet is to be decoded (audio frame or video picture).

Presentation time-stamp (PTS): In MPEG, data that may be present in a packet header which indicates the time that the first unit (audio frame or video picture) in the packet is to be presented to the viewer.

System time clock (STC): A common time base used to create time stamps. The use of a common time base to unify the measurement of the timing of coded data (SCR) and the timing of the presentation of data (the PTS and DTS fields), ensures correct synchronization and buffer management.

System target decoder (STD): In MPEG, a hypothetical model of a decoder used in encoding to create MPEG streams. Real decoders need not be implemented with the same architecture or timing structure as the STD.

Receiver: A device including a decoder. In general, a receiver includes a decoder, tuner, and demodulator.

Reference clock: A local clock in the decoder.

Channel: In the context of the present invention, a particular program stream. The word channel also has other meanings, for example, a communications channel or data channel, which is a digital medium that stores or transports a digital data.

Channel buffer: The buffer of a decoder tuned to a particular program stream.

Block: In the multiplexing method of the present invention, any arbitrary grouping of data corresponding to a fixed time duration of presentation. In MPEG, a macroblock is a block which is the unit of motion compensation and adaptive quantization, thus representing a fixed amount of spatial data. A macroblock in MPEG further comprises one or more luminance blocks and one or more color difference blocks.

Reorder buffer: In MPEG, a buffer used in a video decoder to store I- or P-pictures while the sequence of pictures is reordered before presentation. This is necessitated often in the presence of B-frames.

Stuffing bits: In MPEG, extra stuffing code-bits that are inserted into a compressed bit-stream for the purpose of increasing the bit-rate of the stream. Stuffing bits are discarded during decoding.

Stuffing bytes: Eight stuffing bits.

MPEG Profile: In MPEG-2, the image/picture resolution. The most common profile for broadcast quality is the main profile.

Main Profile (MP): The MPEG-2 profile for CCIR-601 video.

MPEG Level: In MPEG-2, a set of minimum specifications and a subset of MPEG-2 features.

Medium Level (ML): A common MPEG-2 level.

MP@ML: In MPEG-2, MP and ML compliance. An MP@ML compliant decoder has at least 1.8M bits of decoder buffer storage.

B. Digital Video Coding

A video program typically is organized as an ordered sequence of frames, each frame a scene at a particular point in time. It should be noted that the word "frame" is also used in the art of audio-compression and in the MPEG standard to refer to a basic unit of compressed audio. For that reason, the word "picture" is also used herein to indicate a video frame. Each video frame may be thought of as discretized into a two-dimensional array of picture elements (called pixels or pels), and may be split into two or more fields, each field consisting of a subset of the pixels in the picture. Such splitting is called interlacing. In the NTSC (U.S.A and Japan), PAL and SECAM (elsewhere) broadcast television standards, for example, each video frame consists of two fields, and each field consists of the pixels in alternating horizontal lines of the picture.

Each pixel contains information to reproduce the color (hue and saturation) and brightness, and this data may be expressed in various ways. One way is as red, green, and blue ("RGB") values corresponding to the relative amounts of red, green, and blue primaries needed to reproduce the color and brightness. Cathode ray tubes common in television displays have guns that produce red, green, and blue on the screen in response to voltages in the guns. The data can also be expressed at each pixel as intensity data (e.g., luminance) and color data, where the color data is expressed in chrominance coordinates, in hue and saturation coordinates, or some other way. Techniques are known for converting between the various ways of representing pixel information.

The information in each pixel can be represented digitally. Thus, a video program can be converted into a digital data stream which consists of an ordered sequence of bits describing the pixel values in each video frame. Similarly, audio associated with the program can be converted into digital data, and can be identified with the video on a picture-by-picture basis.

It is well known in the art that video data can be compressed. First, the number of bits required to represent each individual pixel may be reduced on a pixel-by-pixel basis. That is, the data of each pixel is processed (reduced) without reference to the data of any other pixel. Second, the number of bits required to represent a field or a picture can be reduced by taking advantage of spatial redundancies in the field or picture. For example, regions of uniform, slowly, or smoothly varying color or brightness may be represented by fewer bits (i.e. less data) than regions of many changes and edges. Third, the number of bits required to represent a sequence of pictures may be reduced by taking advantage of temporal redundancies—areas in the pictures of a sequence that vary slowly or hardly at all in time. The art of image compression also is called image coding. The first method above commonly is called color quantization, the second is called intraframe coding or intra-coding and typically includes color quantization, and the third is called interframe coding or inter-coding and typically, but not necessarily, includes intra-coding.

C. The MPEG Video Coding Standard

The preferred embodiment of the present invention is for video streams which have been compressed in accordance with the MPEG standard. As will be understood to one in the art, the present invention may also be used with video streams that have been compressed using other compression schemes.

The video part of the MPEG standard uses motion compensated predictive coding, the discrete cosine transform (DCT) and adaptive quantization, each of these operating on images on a block-by-block basis. Motion estimation refers to the process of computing the spatial displacement (in the form of motion vectors) from picture to picture, and is usually done by measuring the motion of blocks of pixels from picture to picture. Motion compensation uses the resultant motion vectors to compensate for the motion. MPEG uses both forward motion estimation (in which the estimation is of the future referenced to the past), and backward motion estimation (in which the estimation is of the past referenced to the future). Forward and backward motion estimation are also combined to produce bidirectional motion estimation.

Video frames to be compressed typically consist of an array of luminance pixels, where luminance is denoted by Y, and two arrays of chrominance pixels, where the chrominance signals are denoted by $C_r$ and $C_b$, respectively.

According to the MPEG compression method, video frames (pictures) are classified into one of three types: I-frames, also called I-pictures and intraframe coded pictures; P-frames or P-pictures, also called predictively coded pictures; and B-frames or B-pictures, also called Bidirectionally coded pictures. The three types of video frames differ in their use of motion estimation.

I-pictures use purely spatial compression and are processed independently of other pictures. Thus, I-pictures are processed entirely by intraframe operations and only a moderate level of compression is achieved. On the other hand, a complete picture can be generated from an I-picture alone.

P-pictures and B-pictures also use predictive coding, so can be thought of as dependent pictures.

P-pictures are coded using previous I-pictures or previous P-pictures. The compression of P-pictures relies on temporal prediction from previous I- or P-pictures using motion compensation. Only forward motion estimation/compensation is used in the temporal prediction. The I- or P-picture from which a P-picture is temporally predicted is called the anchor picture to the P-picture. It is also called the reference picture or reference frame.

B-pictures are coded by a bidirectional motion compensated predictive encoder using the next "future" I- or P-picture for backwards prediction and the previous I- or P-picture for forward prediction. The two adjacent I- or P-pictures from which a B-picture is temporally predicted are thus called anchor pictures of the B-picture. The B-picture temporal prediction uses motion compensation in forward and/or backward directions. B-pictures are never used to predict other pictures. Due to the dependence of B-pictures on the two adjacent anchor pictures, B-pictures alone do not contain sufficient data from which to generate a recognizable picture.

In accordance with the MPEG standard, pictures are arranged in ordered groups. The standard allows the encoder to choose the frequency and location of I-pictures. A group of pictures is intended to assist random access into the sequence, thus the first coded picture in a group is normally an I-picture. A typical group then is a series of pictures which might include, as an example, an I-picture as the first picture, P-pictures distributed following every third picture, and a B-picture between every "I and P" and "P and P" sequence. Thus, a typical display order of picture types consistent with this example, might include an I-picture every fifteenth frame, each I-picture followed by two B-pictures, then a sequence of a P-picture followed by two B-pictures, until the next group starts with an I-picture. That is, the display order of I B B P B B P B B P B B P B B I B B P B B P B B ... A thirty picture-per-second environment which includes an I-picture every fifteenth frame, corresponds to having an independent picture every one half-second.

In accordance with the MPEG standard, after the video signals are digitized, the digital data is organized into macroblocks. A macroblock is the unit of motion compensation and adaptive quantization. A number of macroblocks comprise a picture. Each macroblock defines a predetermined spatial region in a picture, and contains luminance and chrominance information.

The MPEG proposal provides for the arrangement of macroblocks into slices. A slice is an integer number of consecutive macroblocks from a raster of macroblocks. A slice represents the boundary within which differential coding of macroblock parameters, e.g., DC coefficients of a DCT, and motion vectors, is performed. Each slice has its own header information, can be independent of other slices, and each contains at least one macroblock. Slices do not overlap. The position of slices may change from picture to picture. The first slice starts with the first macroblock in the picture and the last slice ends with the last macroblock in the picture. The first macroblock in a slice has its macroblock parameters, e.g., DC coefficients of a DCT (if intraframe coded) and motion vectors, differentially coded from a constant value. Each subsequent macroblock in a slice has its macroblock parameters measured as an offset from the previous macroblock in the slice. Accordingly, the size of the slice is the minimum size for which a piece of data can be recovered and correctly decoded. If part of a slice is lost, it may not be possible to decode the differences in motion vectors or the DC coefficients contained in the remaining part of the slice.

A macroblock comprises four 8×8 luminance blocks ($Y_0$, $Y_1$, $Y_2$, $Y_3$) and two 8×8 color difference blocks ($C_r$ and $C_b$). The four luminance blocks ($Y_0$, $Y_1$, $Y_2$, $Y_3$) and two color difference blocks ($C_r,C_b$), which form a single macroblock, are used to encode a 16×16 picture element array covering the same spatial region in a picture. As described above, a macroblock serves as the smallest unit of motion compensation and adaptive quantization.

In accordance with the MPEG standard, motion-compensated predictive coding is carried out by calculating motion vectors for every macroblock in a P-picture or B-picture. MPEG compression usually encodes motion vectors on a macroblock basis, but does not specify the technique for computing them. Thus, a variety of different motion estimation techniques can be implemented consistent with the MPEG standard. One technique, for example, is to compute motion vectors from the picture-to-picture correlation of blocks of pixels in the luminance signal, resulting in a motion vector for the luminance component of the macroblock.

The best mode for encoding each macroblock is selected. Within a given picture, each macroblock is coded in one of several different modes. The intraframe coding mode refers to macroblock coding in which only spatial information is used. Conversely, the interframe coding modes (forward motion, backward motion, and bidirectional motion) refer to macroblock coding in which information from pictures other than the current picture is used in the coding, typically for temporal prediction in motion-compensated predictive coding. For I-picture macroblocks, only intraframe coding mode is available.

In a typical encoder, not specified by the MPEG standard, P-picture macroblocks are first checked to determine if interframe coding without motion compensation is appropriate. This decision is made by computing the luminance energy of a forward prediction residual for the macroblock that results from an interframe coding without motion compensation, and comparing it to a threshold value. If the residual energy is below the threshold, then the macroblock will be coded without motion compensation. Otherwise, the residual macroblock from interframe coding with forward motion compensation will be derived and used to determine if inter-coding or intra-coding is to be used, the last step in the coding mode selection.

B-picture macroblocks are similarly processed to determine whether interframe coding is appropriate. Since B-pictures may be bidirectionally coded, interframe coding can be either forward or backward, based on the preceding and following anchor (i.e., I- or P-) pictures. It may also be based on the average of those macroblocks from the preceding and the following anchor pictures. In interframe coding using motion compensation, there are three possible modes: forward, backward, and bidirectional. The choice of coding mode for B-picture macroblocks may be determined on the basis of luminance prediction residual energy.

The final step in the coding mode selection for both P- and B-picture macroblocks is to choose between interframe coding and intraframe coding. Generally, P-pictures and B-pictures are encoded using interframe encoding. This selection could be made by comparing the luminance energy of the original macroblock to the energy of the luminance interframe (with or without motion compensation) prediction residual macroblock. If the original macroblock has less energy than the prediction residual macroblock, the intraframe coding mode is selected.

After the motion vectors have been calculated, each macroblock is transform encoded. Thus, the macroblocks are transformed from pixel domain to the DCT coefficient domain. The picture information in each picture (i.e., pixel values for I-pictures, and residual error after prediction for B- and P-pictures) is transformed using the DCT and then adaptively quantized. For the purpose of performing the DCT, a picture (a video frame) is divided, for example, into blocks of values (i.e., arrays of DCT coefficients).

The DCT process generates blocks of DCT coefficients in a zigzag-scanned format (i.e., the low-frequency coefficients are followed by the higher frequency coefficients). This zigzag scan arrangement facilitates the subsequent run-length coding process. The DCT coefficient for which the frequency is zero in both dimensions is called the DC coefficient.

Next, adaptive quantization is performed on each block of DCT coefficients. After adaptive quantization has been applied to the DCT coefficients, the coefficients undergo further compression involving such known techniques as differential coding, run-length coding, and variable length coding. As a result, the video compression encoder module produces encoded data in the form of variable length code words, which includes information concerning the selected mode of encoding and any motion vectors needed for decoding. Various headers are also included in the encoded bit-stream which provide information such as the picture size in terms of pixels per line and a pixel aspect ratio. The video compression encoder module also outputs information that states which picture the encoded data represents and which macroblock and slice the encoded data represents.

The code words are then further encoded with other MPEG-specific data needed to provide reliable delivery of the variable length encoded compressed video stream.

D. The MPEG Audio Coding Standard

MPEG also includes an audio coding standard. MPEG-1 audio supports mono, stereo, and a dual-mode with two separate channels, useful, for example, for bilingual programs, and a mode called joint stereo, in which inter-channel (left-right) dependencies are also used for bit-rate reduction. In the first stage of MPEG-1 audio compression, an audio signal is converted into spectral subband components, then each subband is quantized. Psychoacoustic models can be used in the encoding process. MPEG-2 adds multichannel support as dual standards: MPEG-1 backwards-compatible coding and nonbackwards-compatible coding.

MPEG audio bit-streams are broken down into units called frames. An MPEG-1 audio stream consists of variable length frames, each frame starting with an MPEG-1 header, followed by the MPEG-1 audio signal, then followed by a variable-length field, which is reserved for ancillary data and ignored by MPEG-1 decoders.

The word "frame" in this context is not to be confused with a video frame. For that reason, the word "picture" also is used herein to indicate a video frame.

A backwards compatible MPEG-2 audio stream has frames which include the necessary MPEG-2 multichannel extension signals in the fields of MPEG-1 frames for ancillary data.

This invention deals with complete MPEG streams including both video and audio. Details are provided herein only for dealing with the video stream, because, for example, it is the determining or limiting part, of processing the audio to be consistent with the method of the present invention that would be straightforward to one in the art.

E. Audio/Video Synchronization and MPEG Receivers

A complete MPEG stream consists of the MPEG video stream, the MPEG audio stream, and other data, such as timing information, all combined and multiplexed together to form a single stream suitable for digital transmission or storage. The MPEG standard imposes syntactical and semantic rules to enable synchronized playback. The standard does not specify the exact architecture or implementation of encoders or decoders, but does specify bit-stream properties and performance requirements that need to be met, such as minimum clock tolerances.

The term program stream is used herein to indicate a coded stream, such as an MPEG stream, for a single program, including the video and audio. Thus, a program stream may consist of the MPEG stream of a digitized motion picture, a digitized terrestrial, cable or satellite television program, or different time segments of the same motion picture or television program.

The video stream, audio stream, etc. are called elementary streams. An MPEG stream thus consists of one or more elementary streams multiplexed together. Data from each elementary stream is stored in units called packets, which typically are serialized in that stream. A packet consists of a packet header followed by packet data. The packet header begins with a start-code, and also identifies the stream to which the packet data belongs. The packet header may also include one or more time-stamps to indicate the timing of the event represented by the packet data. The packet data contains a variable number of contiguous bytes from one elementary stream, e.g., audio, video, or other data.

Packets are organized together into packs. Packs may contain packets from more than one elementary stream, for example, from both the audio and the video stream, and so are used for multiplex-wide operations in decoding. This is in contrast to operations on packet data, called stream-specific operations which reflect the fact that the data in a packet is from one specific elementary stream. A pack commences with a pack header, and may be followed by one or more packets. The pack header may include a time-stamp called the source clock reference (SCR), which specifies the exact time at which the SCR data byte (and thus each other byte) is to enter the decoder from the digital storage medium (the DSM) or the data channel. This target arrival schedule serves as a reference for clock correction and/or for managing buffers in the decoder. The first pack in any stream also may convey information on the maximum data rate and the number of channels in the multiplex.

Thus, multiplex-wide operations performed on packs include the coordination of data retrieval off the DSM or channel, the adjustment of clocks, and the management of buffers.

The two principal stream-specific operations are demultiplexing and synchronizing the playback of multiple elementary streams. Demultiplexing reconstitutes elementary streams from the multiplexed streams using the stream identification codes contained in packet headers. Elementary streams in addition to audio and video streams may include private, reserved, and padding streams.

Synchronization among multiple streams is effected with time-stamps which may be present in packet headers. Presentation time-stamps (PTS) and decoding time-stamp (DTS) fields are used in packet headers for synchronization of audio and video. The PTS is the time at which the first unit (audio frame or video picture) in the packet data is to be presented to the viewer, and the DTS is the time that the first unit (audio frame or video picture) in the packet data is to be decoded. All time-stamps, including those in pack headers, are adjusted during encoding to a master time base called the system time-clock (STC). The use of a common time base to unify the measurement of the timing of coded data (SCR in the pack header), and the timing of the presentation of data (the PTS and DTS fields in packet headers) ensures correct synchronization and buffer management. SCR, PTS, and, if used, DTS fields are inserted during encoding at internals not necessarily equal, but not to exceed some specified value—0.7 seconds in MPEG-1. Also, in MPEG-1, these time stamps are in units of 90 kHz.

A decoding system, including all of the synchronized decoders and the source of the coded data, must have exactly one independent time-master. This fact is a natural result of the requirement to avoid overflow and underflow in finite size buffers, while maintaining synchronization of the presentation of data. All other synchronized entities must slave the timing of their operation to the time-master. If a decoder attempts to have more than one simultaneous time-master it may experience problems with buffer management or synchronization. Thus, playback of several streams is synchronized by adjusting the playback of all streams to a single master time base rather than by adjusting the playback of one stream to match that of another. The master time base may be one of the individual stream's decoders' clocks, for example, the video decoder or the audio decoder, it may be the DSM or channel clock, or it may be a separate STC such as some external clock. The time-master must communicate to the others the correct value of the STC. A time slave will typically maintain a local STC which is incremented nominally at 90 kHz (for MPEG-1) between updates or corrections. In this way, each entity has a continuously updated value of the STC which is nominally correct and which it uses to compare with the time-stamps.

The MPEG stream properties and semantics defined above are set out in the MPEG standard using a hypothetical reference model of decoding in the form of a hypothetical decoder called the system target decoder (STD). The STD model is used by encoders to create MPEG streams, but real decoders need not be implemented with the same architecture or timing structure as the STD.

The STD model consists of a demultiplexer followed by, for each elementary stream, a first-in first-out (FIFO) buffer followed by a decoder. In the model, data present in headers of the packs or packets, but not part of packet data (e.g., SCR, DTS, PTS, packet lengths, etc.) is not delivered to any of the stream buffers, but may be used to control the system. In one preferred embodiment of the present invention, such data is used to optimize the efficiency of transmitting VBR data.

In the STD model, the data output of the buffer is decoded instantaneously, and may be delayed in a reorder buffer before being presented to the viewer at the output of the STD. Reorder buffers are used only for video decoding in order to store I-pictures and P-pictures while the sequence of presentation pictures is reordered before presentation. This is often necessitated in the presence of B-frames.

As an example, consider a decoder for a video stream which includes an internal clock. The buffer at any time includes packets of the stream. The output of the buffer is connected to the decoder. The decoder needs to know when to decode the next packet. If a packet header has a DTS, then the decoder takes that packet when the DTS is less than or equal to the decoder clock. If a packet does not contain a DTS, then the decoder takes that packet at the next time instant that the decoder expects a packet, based on previous packets decoded.

Thus, MPEG streams containing elementary streams are formed (video and/or audio) and multiplexed together.

F. MPEG-2 Profiles and Levels

The MPEG-2 Standard defines classes of image resolution and sound quality (the "profile") and a minimum subset of specifications and features of the MPEG standard (the "level"). For example, main profile ("MP") covers the common CCIR-601 standards of a resolution of 704 pixels per line for 525 line/60 Hz systems (NTSC) and 625 line/50 Hz systems (PAL and SECAM). Low profile ("LP") covers the SIF resolution which is half of CCIR-601 and is commonly used in video conferencing, while high profile ("HR") is usually reserved for high definition television (HDTV). There are three levels, low level (LL), medium level (ML), and high level (HL). A decoder meeting MPEG-2 compliance specifications must meet these minimum specifications and offer at least the subset of MPEG-2 features of that level. For example, the most common decoder is the MP@ML compliant decoder. It must have a decoder buffer that is at least 1.8M bits in size. An MP@HL compliant decoder must have a larger decoder buffer and must be able to implement many of the scaleable features of MPEG-2.

What is claimed is:

1. A method of increasing utilization of a first channel when transmitting a multiplex of a set of one or more encoded program streams, each program stream in said set being decodeable by a corresponding decoder, each corresponding decoder including a corresponding decoder buffer, said decoder buffers having a maximum allowable size, said method comprising:

(a) selecting from at least one of said encoded program streams encoded pictures to be modified that use bidirectional prediction, said selecting being carried out according to a criterion;

(b) modifing each said selected encoded picture by reducing prediction error data to form a corresponding modified encoded picture, said modified encoded picture having less data than said selected encoded picture; and (c) transmitting the corresponding modified encoded pictures through said first channel in place of the selected encoded pictures;

wherein said criterion includes preventing any underflow of any decoder buffer.

2. The method of claim 1, wherein said step of modifying deletes each said selected encoded picture, said modified encoded picture having no data.

3. A method of increasing utilization of a first channel when transmitting a multiplex of a set of one or more encoded program streams, each program stream in said set being decodeable by a corresponding decoder, each corresponding decoder including a corresponding decoder buffer, said decoder buffers having a maximum allowable size, said method comprising:

(a) selecting encoded pictures to be modified, said selecting according to a criterion;

(b) modifying each said selected encoded picture to form a corresponding modified encoded picture, said modified encoded picture having less data than said selected encoded picture; and (c) transmitting the corresponding modified encoded pictures through said first channel in place of the selected encoded pictures;

whereby said criterion includes preventing any underflow of any decoder buffer;

wherein said encoded program streams include predictively encoded pictures, each said predictively encoded picture having one or more corresponding anchor pictures, each said predictively encoded picture having prediction data and prediction error data, said step of selecting selects predictively encoded pictures that are not anchor pictures, and said step of modifying deletes the prediction error data from each selected encoded picture.

4. The method of claim 3, wherein said encoded program streams are MPEG encoded program streams, and said step of selecting selects B-pictures.

5. The method of claim 3, wherein said step of selecting includes a second criterion.

6. The method of claim 5, wherein said second criterion includes maintaining essentially constant perceived image quality.

7. The method of claim 1, further comprising the step of:
(d) transmitting the selected encoded pictures.

8. The method of claim 7, wherein said step (d) of transmitting transmits through a second channel.

9. A method of increasing utilization of a first channel when transmitting a multiplex of a set of one or more encoded program streams, each program stream in said set being decodeable by a corresponding decoder, each corresponding decoder including a corresponding decoder buffer, said decoder buffers having a maximum allowable size, said method comprising:
(a) selecting encoded pictures to be modified, said selecting according to a criterion;
(b) modifying each said selected encoded picture to form a corresponding modified encoded picture, said modified encoded picture having less data than said selected encoded picture;
(c) transmitting the corresponding modified encoded pictures through said first channel in place of the selected encoded pictures;
whereby said criterion includes preventing any underflow of any decoder buffer;
(d) transmitting the selected encoded pictures;
(e) determining whether it is possible to decode said selected encoded picture from said first channel; and
(f) whenever possible, decoding said selected encoded picture rather than the corresponding modified encoded picture.

10. The method of claim 9, wherein said encoded program streams include predictively encoded pictures, each said predictively encoded picture having one or more corresponding anchor pictures, each said predictively encoded picture having prediction data and prediction error data, said step of selecting selects predictively encoded pictures that are not anchor pictures, and said step of modification deleted the prediction error data from each said selected encoded picture.

11. The method of claim 10, wherein said encoded program streams are MPEG encoded program streams, and said step of selecting selects B-pictures.

12. The method of claim 11, wherein said step of determining includes comparing one or more time stamps of the selected encoded pictures and one or more time stamps of the corresponding modified encoded pictures.

13. A method in accordance with claim 1, wherein the prediction error data of the selected encoded picture is completely reduced so that it is eliminated.

14. A method of increasing utilization of a first channel when transmitting a multiplex of a set of one or more encoded program streams, each program stream in said set being decodeable by a corresponding decoder, each corresponding decoder including a corresponding decoder buffer, said decoder buffers having a maximum allowable size, said method comprising:

(a) selecting from at least one of said encoded program streams encoded pictures to be modified that use bidirectional prediction, said selecting being carried out according to a criterion that includes preventing any underflow of any decoder buffer;
(b) modifying each said selected encoded picture by reducing prediction error data included therein to form a corresponding modified encoded picture having less data than said selected encoded picture; and
(c) transmitting the corresponding modified encoded pictures through said first channel in place of the selected encoded pictures.

15. A method in accordance with claim 14, wherein the prediction error data of the selected encoded picture is completely reduced so that it is eliminated.

16. A method in accordance with claim 14, further comprising:
(d) transmitting the selected encoded pictures.

17. A method in accordance with claim 16, wherein said step (d) of transmitting transmits through a second channel.

18. A method in accordance with claim 16, further comprising:
(e) receiving the selected encoded pictures and the corresponding modified encoded pictures;
(f) determining whether to decode said selected encoded pictures; and
(g) decoding said selected encoded pictures in response to a positive determination in step (f).

19. A method of increasing utilization of a first channel when transmitting a multiplex of a set of one or more encoded program streams, each program stream in said set being decodeable by a corresponding decoder, each corresponding decoder including a corresponding decoder buffer, said decoder buffers having a maximum allowable size, said method comprising:
(a) selecting encoded pictures to be modified, said selecting being carried out according to a criterion that includes preventing any underflow of any decoder buffer;
(b) modifying each said selected encoded picture by reducing prediction error data included therein to form a corresponding modified encoded picture having less data than said selected encoded picture;
(c) transmitting the corresponding modified encoded pictures through said first channel in place of the selected encoded pictures;
(d) transmitting the selected encoded pictures;
(e) receiving the selected encoded pictures and the corresponding modified encoded pictures;
(f) determining whether to decode said selected encoded pictures; and
(g) decoding said selected encoded pictures in response to a positive determination in step (f);
wherein said step (f) of determining further includes,
comparing one or more time stamps associated with the selected encoded pictures with one or more time stamps associated with the corresponding modified encoded pictures.

20. An apparatus including an encoded digital video modification system for transmitting one or more encoded program streams which are decodeable by a corresponding decoder having a decoder buffer, the decoder buffers having a maximum allowable size, the encoded digital video modification system comprising:

a program analyzer and modifier configured to receive the one or more encoded program streams and to select encoded pictures to be modified according to a criterion that includes preventing any underflow of any decoder buffer, the program analyzer and modifier further configured to modify each said selected encoded picture to form a corresponding modified encoded picture having less data than said selected encoded picture;

a primary channel modulator, coupled to the program analyzer and modifier, configured to modulate the corresponding modified encoded pictures onto a primary channel;

an overflow channel modulator, coupled to the program analyzer and modifier, configured to modulate the selected encoded pictures onto an overflow channel; and a combiner, coupled to the primary and overflow channel modulators, configured to combine the primary channel with the overflow channel.

21. An apparatus in accordance with claim 20, wherein the program analyzer and modifier modifies each said selected encoded picture by reducing prediction error data included therein.

22. An apparatus in accordance with claim 20, wherein the program analyzer and modifier modifies each said selected encoded picture by eliminating prediction error data included therein.

23. An apparatus in accordance with claim 20, further comprising:

a multiplexer, coupled to the encoded digital video modification system, configured to provide a multiplex of a set of the one or more encoded program streams to the encoded digital video modification system.

24. An apparatus in accordance with claim 20, further comprising a receiver for receiving the combined primary and overflow channels, the receiver comprising:

primary and overflow demodulators configured to demodulate data from the primary and overflow channels, respectively;

a first demultiplexer, coupled to the primary demodulator, configured to extract a primary packet stream from an output of the primary demodulator;

a second demultiplexer, coupled to the overflow demodulator, configured to extract an overflow packet stream from an output of the overflow demodulator;

a buffer coupled to the second demultiplexer;

a time stamp comparator, coupled to the first demultiplexer and the buffer, configured to compare a time stamp associated with a next packet from the primary packet stream with a time stamp associated with a next packet from the overflow packet stream; and a packet multiplexer, coupled to the first demultiplexer, the buffer and the time stamp comparator, configured to select one of the next packets from the primary packet stream and the overflow packet stream in response to a comparison made by the time stamp comparator.

25. An apparatus in accordance with claim 24, wherein the time stamp comparator instructs the packet multiplexer to select the next packet from the primary packet stream when the time stamp associated with the next packet from the primary packet stream is less than the time stamp associated with the next packet from the overflow packet stream.

26. An apparatus in accordance with claim 25, wherein the next packet from the overflow packet stream is saved in the buffer for comparison with a following packet from the primary packet steam.

27. An apparatus in accordance with claim 24, wherein the time stamp comparator instructs the packet multiplexer to select the next packet from the overflow packet stream when the time stamp associated with the next packet from the primary packet stream is equal to the time stamp associated with the next packet from the overflow packet stream.

28. An apparatus including an encoded digital video modification system for transmitting one or more encoded program streams which are decodeable by a corresponding decoder having a decoder buffer, the decoder buffers having a maximum allowable size, the encoded digital video modification system comprising:

a program analyzer and modifier configured to receive the one or more encoded program streams and to select encoded pictures to be modified according to a criterion that includes preventing any underflow of any decoder buffer, the program analyzer and modifier further configured to modify each said selected encoded picture to form a corresponding modified encoded picture having less data than said selected encoded picture;

a primary packet storage device , coupled to the program analyzer and modifier, configured to store packets that include the corresponding modified encoded pictures;

an overflow packet storage device, coupled to the program analyzer and modifier, configured to store packets that include the selected encoded pictures; and a packet multiplexer coupled to and configured to select packets from the primary and overflow packet storage devices and to provide an output multiplex of selected packets.

29. An apparatus in accordance with claim 28, wherein the program analyzer and modifier modifies each said selected encoded picture by reducing prediction error data included therein.

30. An apparatus in accordance with claim 28, wherein the program analyzer and modifier modifies each said selected encoded picture by eliminating prediction error data included therein.

31. An apparatus in accordance with claim 28, further comprising:

a multiplexer, coupled to the encoded digital video modification system, configured to provide a multiplex of a set of the one or more encoded program streams to the encoded digital video modification system.

32. An apparatus in accordance with claim 28, further comprising a receiver for receiving a modulation of the output multiplex of selected packets, the receiver comprising:

a demodulator configured to demodulate data from the modulation of the output multiplex of selected packets;

a first demultiplexer, coupled to the demodulator, configured to extract a primary packet stream from an output of the demodulator;

a second demultiplexer, coupled to the demodulator, configured to extract an overflow packet stream from an output of the demodulator;

a storage device coupled to the second demultiplexer;

a time stamp comparator, coupled to the first demultiplexer and the storage device, configured to compare a time stamp associated with a next packet from the primary packet stream with a time stamp associated with a next packet from the overflow packet stream; and a packet multiplexer, coupled to the first demultiplexer, the storage device and the time stamp comparator, configured to select one of the next packets from the primary packet stream and the overflow packet stream in response to a comparison made by the time stamp comparator.

33. A method in accordance with claim 7, wherein said step (d) of transmitting transmits the selected encoded pictures through said first channel in available time intervals.

34. A method in accordance with claim 16, wherein said step (d) of transmitting transmits the selected encoded pictures through said first channel in available time intervals.

\* \* \* \* \*